US011032590B2

(12) United States Patent
Shi et al.

(10) Patent No.: US 11,032,590 B2
(45) Date of Patent: Jun. 8, 2021

(54) METHODS, DEVICES, AND SYSTEMS FOR PROVIDING PANORAMIC VIDEO CONTENT TO A MOBILE DEVICE FROM AN EDGE SERVER

(71) Applicant: AT&T Intellectual Property I, L.P., Atlanta, GA (US)

(72) Inventors: Shu Shi, Summit, NJ (US); John F. Murray, Morris County, NJ (US); Michael Hwang, New Providence, NJ (US); Rittwik Jana, Montville, NJ (US); Varun Gupta, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/119,652

(22) Filed: Aug. 31, 2018

(65) Prior Publication Data
US 2020/0077124 A1    Mar. 5, 2020

(51) Int. Cl.
*H04N 21/238* (2011.01)
*H04N 21/218* (2011.01)
(Continued)

(52) U.S. Cl.
CPC ..... *H04N 21/238* (2013.01); *H04N 21/21805* (2013.01); *H04N 21/222* (2013.01); *H04N 21/2402* (2013.01); *H04N 21/41407* (2013.01)

(58) Field of Classification Search
CPC ........... H04N 21/238; H04N 21/21805; H04N 21/222; H04N 21/2402; H04N 21/41407
(Continued)

(56) References Cited

U.S. PATENT DOCUMENTS 8,755,342 B2    6/2014    Iyer et al.
8,892,686 B1 *  11/2014   Thibeault ............ H04L 67/2828
                                              709/217
(Continued)

FOREIGN PATENT DOCUMENTS

WO    2017205642 A1    11/2017
WO    2017205794       11/2017
(Continued)

OTHER PUBLICATIONS

Asha, "MD360Player4Android," https://github.com/ashqal/MD360Player4Android, 2016, 6 pgs.
(Continued)

*Primary Examiner* — Nnenna N Ekpo
(74) *Attorney, Agent, or Firm* — Guntin & Gust, PLC; Atanu Das

(57) ABSTRACT

Aspects of the subject disclosure may include, for example, embodiments for determining a first motion-to-update latency of a mobile device in relation to receiving a video content update provided by a video content server. Further embodiments include, responsive to determining that the first motion-to-update latency exceeds a threshold: determining a motion-to-update latency of the mobile device in relation to receiving video content updates from a plurality of edge servers resulting in a plurality of motion-to-update latencies, identifying a second motion-to-update latency from the plurality of motion-to-update latencies that is below the threshold, identifying an edge server associated with the second motion-to-update latency, and transmitting video content to the edge server to mitigate the first motion-to-update latency. The edge server provides a portion of the video content at different time intervals to the mobile device and the video content comprises panoramic video content. Other embodiments are disclosed.

20 Claims, 29 Drawing Sheets

(a)

(b)

(51) Int. Cl.
  *H04N 21/222* (2011.01)
  *H04N 21/414* (2011.01)
  *H04N 21/24* (2011.01)
(58) Field of Classification Search
  USPC .................................................... 725/116
  See application file for complete search history.

(56) References Cited

U.S. PATENT DOCUMENTS

| | | | |
|---|---|---|---|
| 9,138,644 B2 | 9/2015 | Perlman et al. | |
| 9,420,283 B2 | 8/2016 | Perlman et al. | |
| 9,743,044 B2 | 8/2017 | Safaei et al. | |
| 9,858,706 B2 | 1/2018 | Pio et al. | |
| 9,918,136 B2 | 3/2018 | Cole et al. | |
| 9,986,221 B2 | 5/2018 | Zhou | |
| 10,015,527 B1* | 7/2018 | Banta | H04N 9/68 |
| 2002/0154691 A1 | 10/2002 | Kost et al. | |
| 2003/0011714 A1 | 1/2003 | Nevins | |
| 2010/0050221 A1 | 2/2010 | Mccutchen et al. | |
| 2013/0141523 A1 | 6/2013 | Banta et al. | |
| 2016/0286128 A1 | 9/2016 | Zhou | |
| 2016/0352791 A1 | 12/2016 | Adams et al. | |
| 2017/0163709 A1 | 6/2017 | Owen | |
| 2017/0180800 A1* | 6/2017 | Mayrand | H04N 21/44218 |
| 2017/0195615 A1 | 7/2017 | Han et al. | |
| 2017/0237964 A1* | 8/2017 | Maenpaa | H04N 13/243 348/39 |
| 2017/0272649 A1 | 9/2017 | Liu et al. | |
| 2017/0289221 A1 | 10/2017 | Khalid et al. | |
| 2017/0332117 A1 | 11/2017 | Haritaoglu et al. | |
| 2017/0336705 A1 | 11/2017 | Zhou et al. | |
| 2017/0347219 A1 | 11/2017 | Mccauley et al. | |
| 2018/0043249 A1 | 2/2018 | Linder et al. | |
| 2018/0074679 A1* | 3/2018 | Wang | G02B 27/0172 |
| 2018/0160123 A1 | 6/2018 | Van Der Auwera et al. | |

FOREIGN PATENT DOCUMENTS

| | | |
|---|---|---|
| WO | 2018011054 A1 | 1/2018 |
| WO | 2018049221 | 3/2018 |
| WO | 2018050606 A1 | 3/2018 |
| WO | 2018083211 A1 | 5/2018 |

OTHER PUBLICATIONS

Bilibili, "ijkplayer", https://github.com/Bilibili/ijkplayer, 2016, 6 pgs.
"Cubemap Transform Open Source Code", Facebook, https://github.com/facebook/transform, 2016, 3 pgs.
"Dynamic Adaptive Streaming over HTTP", https://en.wikipedia.org/wiki/Dynamic_Adaptive_Streaming_over_HTTP, 8 pgs.
FFMPEG, "Ffmpeg streaming guide," https://trac.ffmpeg.org.wiki/StremingGuide, 6 pgs.
"Framework and Overall Objectives of the Future Development of IMT for 2020 and Beyond", ITU-R, 2015, 18 pgs.
"Multi-access Edge Computing (MEC)", ETSI MEC, http://www.etsi.org/technologies-clusters/technologies/multi-access-edge-computing, 5 pgs.
"Next-Generation Video Encoding Techniques for 360 Video and VR", https://code.facebook.com/posts/1126354007399553/next-generation-video-encodin, 2016, 5 pgs.
"Onap architecture overview", https://www.onap.org/wp-content/uploads/sites/20/2017/12/ONAP_CaseSolution_Architecture_120817_FNL.pdf., 2017, 14 pgs.
"Real Time Messaging Protocol", https://en.wikipedia.org/wiki/Real-Time_Messaging_Protocol, 9 pgs.
"Real Time Transport Protocol", https://en.wikipedia.org/wiki/Real-time_Transport_Protocol, 3 pgs.
Abari, O. et al., "Enabling High-Quality Untethered Virtual Reality", 2017, 15 pgs.
Abrash, M., "What VR Could, Should, and Almost Certainly Will Be Within Two Years", http://media.steampowered.com/apps/abrashblog/AbrashDevDays, 2014, 44 pgs.
Amaral, M. et al., "Performance Evaluation of Microservices Architectures using Containers", 2015, 9 pgs.
Cho, J. et al., "ACACIA—Context-aware Edge Computing for Continuous Interactive Applications over Mobile Networks", 2016, 15 pgs.
Cho, J. et al., "Mobile Offloading Architecture", 2014, 13 pgs.
Corbillon, X. et al., "360-Degree Video Head Movement Dataset", 2017, 7 pgs.
Harter, T. et al., "Slacker: Fast Distribution with Lazy Docker Containers", 2016, 16 pgs.
Hosseini, M. et al., "Adaptive 360 VR Video Streaming: Divide and Conquer", 2016, 5 pgs.
Lai, et al., "Furion: Engineering High-Quality Immersive Virtual Reality on Today's Mobile Devices", 2017, 13 pgs.
Lamkin, "Virtual reality headset sales hit 1 million", https://www.forbes.com/sites/paullamkin, Nov. 30, 2017, 3 pgs.
Li, Y. et al., "A Control-Plane Perspective on Reducing Data Access Latency in LTE Networks", 2017, 14 pgs.
Nasrabadi, A. et al., "Adaptive 360-Degree Video Streaming Using Scalable Video Coding", 2017, 9 pgs.
Ochi, D. et al., "Live Streaming System for Omnidirectional Video," 2015, 2 pgs.
Parvez, I. et al., "A Survey on Low Latency Towards 5G: RAN, Core Network and Caching Solutions", 2017, 34 pgs.
Patel, M. et al., "Mobile-Edge Computing", 2014, 36 pgs.
Qian, F. et al., "Optimizing 360 Video Delivery Over Cellular Networks," 2016, 6 pgs.
Satyanarayanan, M. et al., "The case for VM-based cloudlets in mobile computing", 2009, 10 pgs.
Shi, et al., "A Survey of Interactive Remote Rendering Systems," May 2015, 30 pgs.
Wang, K. et al., "MobiScud: A Fast Moving Personal Cloud in the Mobile Network", 2015, 6 pgs.
Xie, X. et al., "POI360: Panoramic Mobile Video Telephony over LTE Cellular Networks," 2017, 14 pgs.
Choy, et al., "A hybrid edge-cloud architecture for reducing on-demand gaming latency", Apr. 11, 2014, 17 pages.
Corbillon, et al., "Viewport-Adaptive Navigable 360-Degree Video Delivery", 2017 IEEE International Conference, 7 pages.
Hosseini, et al., "Adaptive 360 VR Video Streaming: Divide and Conquer", 2016 IEEE International Symposium, 4 pages.
Qian, Feng et al., "Optimizing 360 Video Delivery Over Cellular Networks", Proceedings of the 5th Workshop on All Things Cellular: Operations, Applications and Challenges, ACM, 2016., Oct. 3-7, 2016, 6 pages.
Scoca, et al., "Scheduling Latency-Sensitive Applications in Edge Computing", accessed: Jun. 2018, 11 pages.
Zhou, et al., "Post-Cloud Computing Paradigms: A Survey and Comparison", Tsinghua Science and Technology, 2017, 19 pages.

* cited by examiner

Table 1: Pre-defined cropping regions for 4K (3840x2160) video

| Motion Index | yaw Range | Cropping Parameters |
|---|---|---|
| 1 | [-165°, -105°] | start_x = 0 : start_y = 540<br>width = 1920 : height = 1080 |
| 2 | [-105°, -45°] | start_x = 640 : start_y = 540<br>width = 1920 : height = 1080 |
| 3 | [-45°, 15°] | start_x = 1280 : start_y = 540<br>width = 1920 : height = 1080 |
| 4 | [15°, 75°] | start_x = 1920 : start_y = 540<br>width = 1920 : height = 1080 |
| 5 | [75°, 135°] | start_x = 2560 : start_y = 540<br>width = 1280 : height = 1080<br>start_x = 0 : start_y = 540<br>width = 640 : height = 1080 |
| 6 | [135°, 180°] +<br>[-180°, -165°] | start_x = 3200 : start_y = 540<br>width = 640 : height = 1080<br>start_x = 0 : start_y = 540<br>width = 1280 : height = 1080 |

FIG. 2H

Table 2: Encoding/Decoding Parameters for Latency Tests

| Test Case | Networks | Protocol | Server FFMPEG Parameters | Client FFMPEG Parameters |
|---|---|---|---|---|
| MPEG-4 original | Wi-Fi | RTP | -re -vcodec mpeg4 -q:v 10 -f rtp | None |
| MPEG-4 rtp | Wi-Fi | RTP | -re -vcodec mpeg4 -q:v 10 -f rtp | -probesize 32 |
| MPEG-4 rtmp | Wi-Fi | RTMP | -re -vcodec mpeg4 -q:v 10 -strict -1 -f flv | -probesize 32 |
| MPEG-4 best | Wi-Fi | RTMP | -re -vcodec mpeg4 -q:v 10 -strict -1 -f flv | -probesize 32 -fflags nobuffer |
| MPEG-4 high-bitrate | Wi-Fi | RTMP | -re -vcodec mpeg4 -q:v 1 -strict -1 -f flv | -probesize 32 -fflags nobuffer |
| H.264 hw | Wi-Fi | RTMP | -re -vcodec h264 -tune zerolatency -f flv | -probesize 32 -fflags nobuffer |
| H.264 sw | Wi-Fi | RTMP | -re -vcodec h264 -tune zerolatency -tune fastdecode -f flv | -probesize 32 -fflags nobuffer |
| MPEG-4 lte | LTE | RTMP | -re -vcodec mpeg4 -q:v 10 -strict -1 -f flv | -probesize 32 -fflags nobuffer |

FIG. 2I

Table 3: Breakdown of the Motion-to-Update Latency Test Results

| Test Case | Total Latency (ms) | Server Processing | Network Round Trip | Read Packet | Decoding Queue | Decoding | Display Queue | Display | Render | Bandwidth (Kbps) | FPS |
|---|---|---|---|---|---|---|---|---|---|---|---|
| MPEG-4 original | 1288 | 20.6 | 41.1 | 46.3 | 1094 | 13.8 | 79.6 | 6.1 | 5.7 | 6636 | 29.5 |
| MPEG-4 rtp | 362 | 24.4 | 44.1 | 38.1 | 173 | 15.4 | 78.6 | 6.5 | 9.4 | 6704 | 29.7 |
| MPEG-4 rtmp | 119 | 23.1 | 35.0 | 0.09 | 2.0 | 14.8 | 27.8 | 5.6 | 10.1 | 6772 | 28.7 |
| MPEG-4 best | 101 | 20.7 | 23.1 | 0.08 | 0.1 | 15.7 | 27.7 | 6.2 | 7.5 | 6740 | 28.2 |
| MPEG-4 high-bitrate | 157 | 23.5 | 92.4 | 0.23 | 0.2 | 16.5 | 10.9 | 4.7 | 8.8 | 37458 | 23.5 |
| H.264 hw | 599 | 30.0 | 24.9 | 0.1 | 303 | 150 | 90 | 1.0 | 9.9 | 7521 | 29.9 |
| H.264 sw | 226 | 22.4 | 58.8 | 0.09 | 7.9 | 16.2 | 109.2 | 4.7 | 6.9 | 7512 | 9.4 |
| MPEG-4 lte | 832 | 24.8 | 536 | 0.11 | 214 | 15.2 | 52.9 | 6.4 | 4.9 | 6556 | 37.5 |

FIG. 2J

| Prediction Scheme | Cropping Margin Yaw/Pitch 15/8 | 30/15 | 60/30 |
|---|---|---|---|
| No Prediction | 0.872 | 0.973 | 0.997 |
| Optimal prediction | 0.946 | 0.995 | 0.998 |
| Speed-based prediction | 0.893 | 0.991 | 0.996 |

FIG. 2Q

| Encoding | PSNR |
|---|---|
| MPEG4 | 33.74 |
| MPEG4 w/ Prefetch | 33.91 |
| H264 | 36.85 |
| H264 w/ Prefetch | 37.30 |

FIG. 2T

| Device Form Factor | Yaw/Pitch Margin 15/8 | 30/15 | 60/30 |
|---|---|---|---|
| VR Headset | 20.87% | 32.74% | 45.65% |
| Smartphone | 33.23% | 48.31% | 75.58% |

FIG. 2V

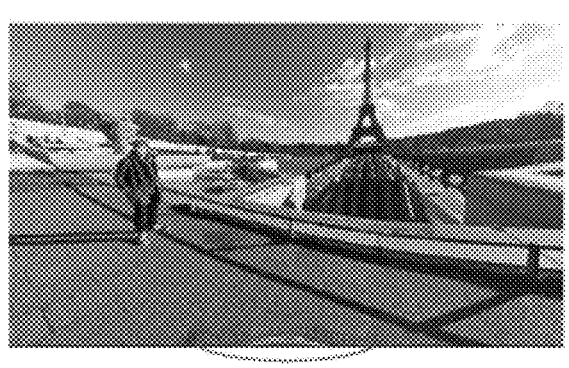
(a)
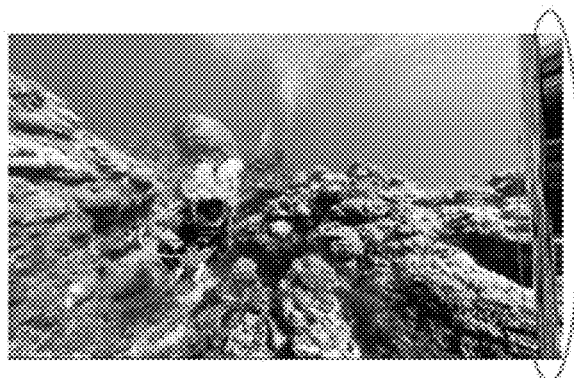
(b)
FIG. 2X

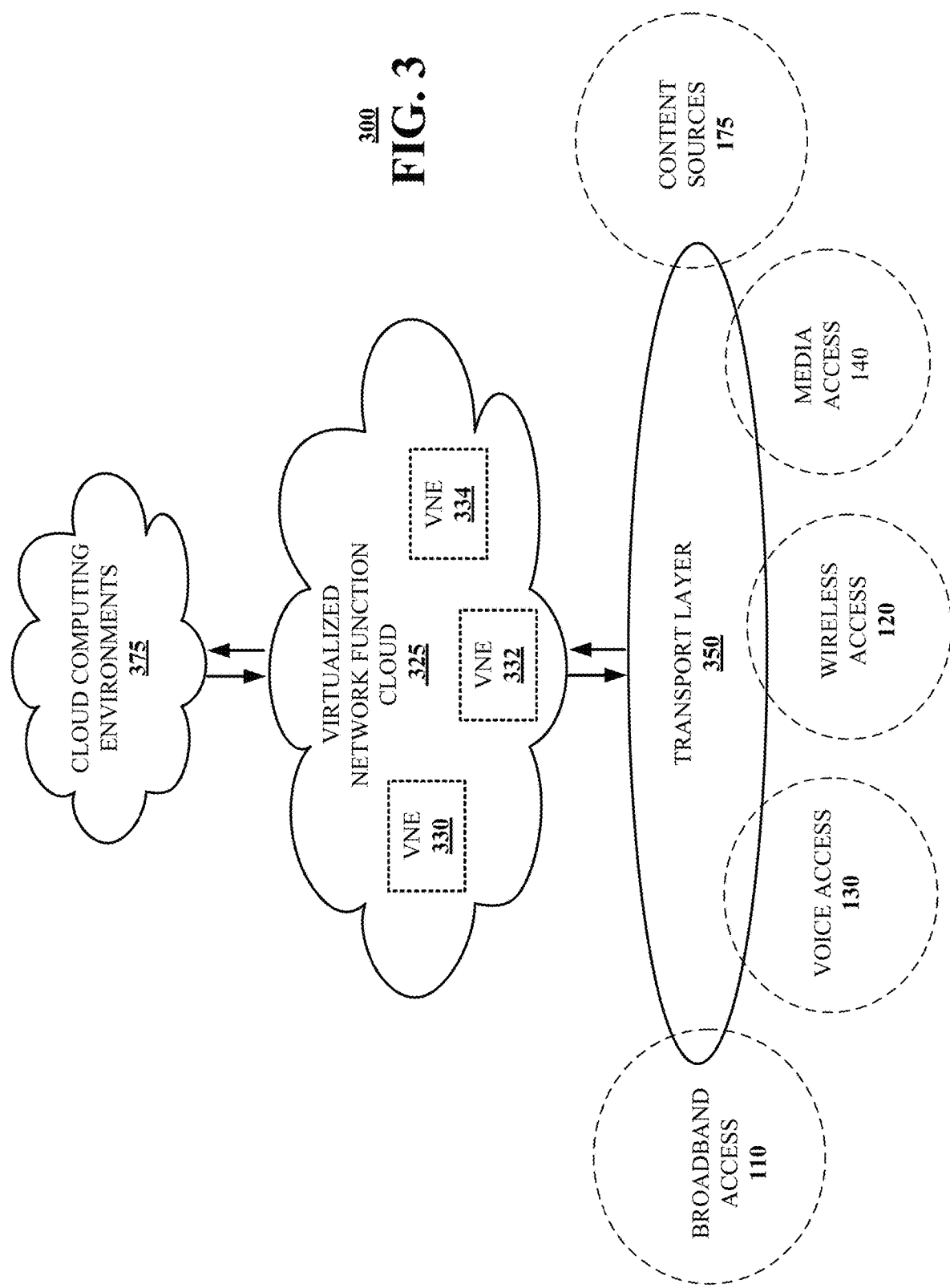

ns/tags>
METHODS, DEVICES, AND SYSTEMS FOR PROVIDING PANORAMIC VIDEO CONTENT TO A MOBILE DEVICE FROM AN EDGE SERVER

FIELD OF THE DISCLOSURE

The subject disclosure relates to methods, devices, and systems for providing panoramic video content to a mobile device from an edge server.

BACKGROUND

Panoramic video content such as 360 degree video content that can be viewed using virtual reality headsets communicatively coupled to mobile phones. Further, a video content server can provide the panoramic video content over a wireless network to the mobile phone. In addition, the video content can provide portions of the video content to the mobile phone according to the head movement of user viewing the video content using the virtual reality headset.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
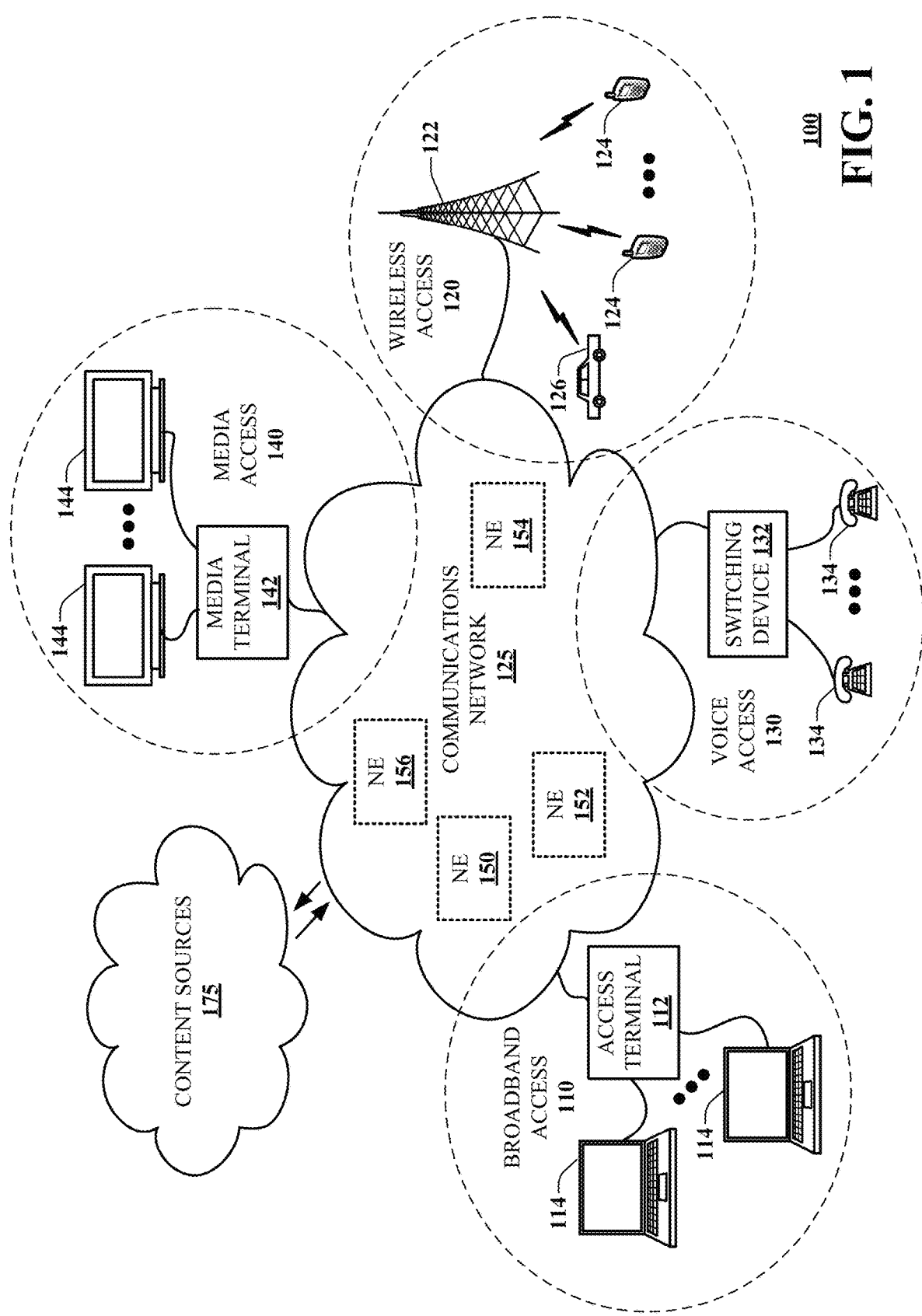
FIG. 1 is a block diagram illustrating an example, non-limiting embodiment of a communications network in accordance with various aspects described herein.

The subject disclosure describes, among other things, illustrative embodiments can include determining a first motion-to-update latency of a mobile device in relation to receiving a video content update provided by a video content server. Further embodiments include, responsive to determining that the first motion-to-update latency exceeds a threshold: determining a motion-to-update latency of the mobile device in relation to receiving video content updates from a plurality of edge servers, the determining results in a plurality of motion-to-update latencies, identifying a second motion-to-update latency from the plurality of motion-to-update latencies that is below the threshold, identifying an edge server associated with the second motion-to-update latency, and transmitting video content to the edge server to mitigate the first motion-to-update latency of the video content server. The edge server provides a portion of the video content at different time intervals to the mobile device resulting in a plurality of portions of video content. The video content comprises panoramic video content. Other embodiments are disclosed.

One or more aspects of the subject disclosure include a device. The device comprising a processing system including a processor, and a memory that stores executable instructions that, when executed by the processing system, facilitate performance of operations. Operations can comprise determining a first motion-to-update latency of a mobile device in relation to receiving a video content update provided by a video content server. Further operations include, responsive to determining that the first motion-to-update latency exceeds a threshold; determining a motion-to-update latency of the mobile device in relation to receiving video content updates from a plurality of edge servers, the determining results in a plurality of motion-to-update latencies, identifying a second motion-to-update latency from the plurality of motion-to-update latencies that is below the threshold, identifying an edge server associated with the second motion-to-update latency, and transmitting video content to the edge server to mitigate the first motion-to-update latency of the video content server. The edge server provides a portion of the video content at different time intervals to the mobile device resulting in a plurality of portions of video content. The video content comprises panoramic video content.

One or more aspects of the subject disclosure include a machine-readable medium, comprising executable instructions that, when executed by an edge server including a processor, facilitate performance of operations. Operations can comprise receiving a request for a portion of video content from a mobile device. Further operations can include providing the portion of the video content to the mobile device. The video content comprises panoramic video content. A video content server transmits the video content to the edge server using a selected streaming protocol in response to determining a motion-to-update latency for the edge server using the selected streaming protocol is below a threshold.

One or more aspects of the subject disclosure include a method. The method can comprise providing, by a mobile device comprising a processor, a request for a portion of video content to an edge server. The request includes a motion index. Further, the method can include receiving, by the mobile device, the portion of video content from the edge server according to the motion index. The edge server is selected from a plurality of edge servers by a video content server according to a motion-to-update latency of the edge server being below a threshold. The edge server crops the portion of the video content prior to providing the portion of the video content to the mobile device. The portion of the video content comprises a margin area. The edge server determines the margin area according to a plurality of previous portions of video content provided to the mobile device.

Referring now to FIG. 1, a block diagram is shown illustrating an example, non-limiting embodiment of a communications network 100 in accordance with various aspects described herein. Further, the communications network 100 can include the core video content server and edge video content server as well as the mobile devices described herein.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
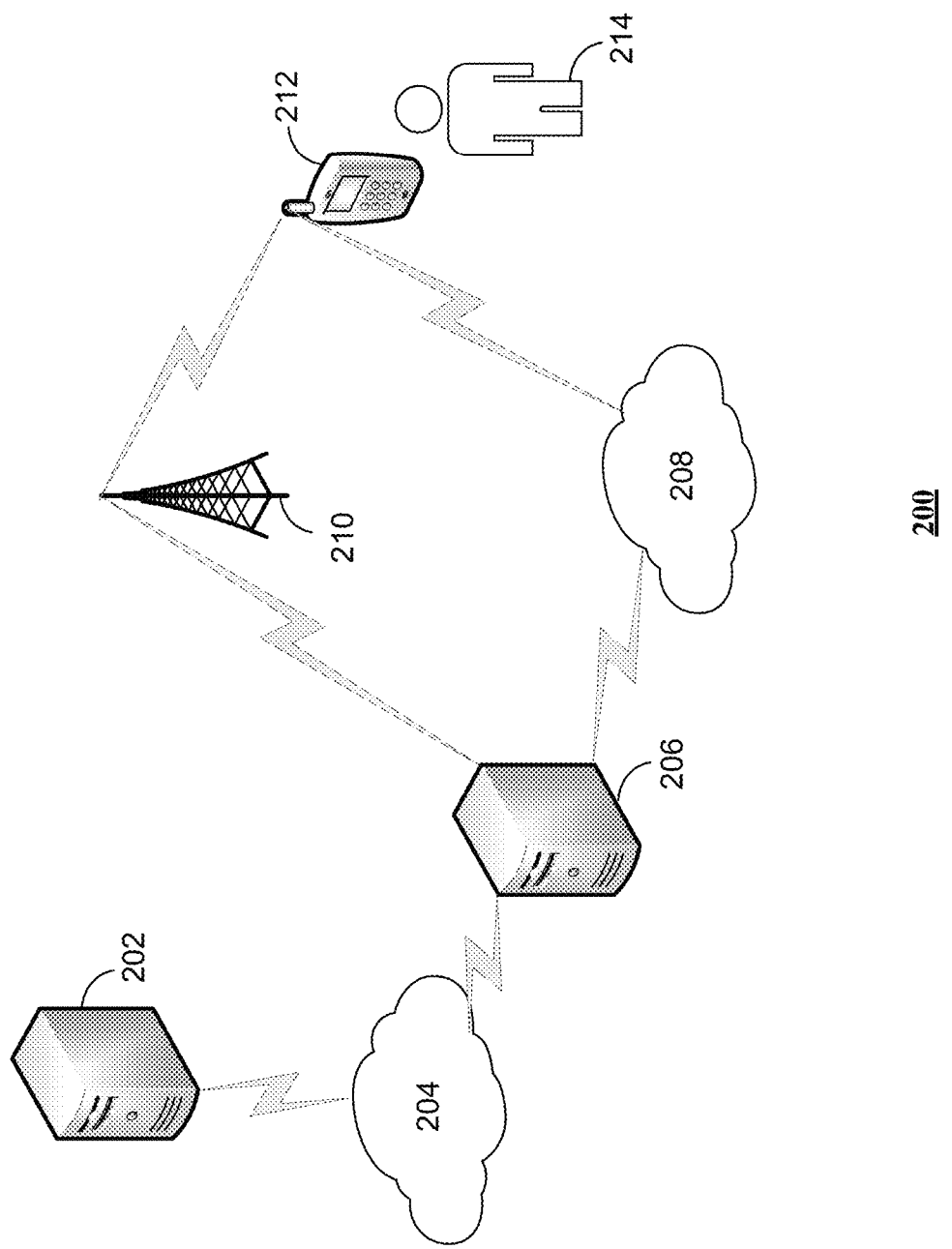
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In one or more embodiments, system 200 can include a core video content server 202 that is communicatively coupled to an edge video content server 206 over a communication network 204. The communication network 204 can be a combination of wireless networks and wired networks. In some embodiments, the communication network 204 can be an aspect of the Internet and the core video content server can be considered a cloud server. Further, system 200 can include the edge video content server 206 can be communicatively coupled to a mobile device 212 associated with a user 214 over either a cellular network 210 or other wireless communication network 208 (e.g. WiFi). The mobile device 212 can include, but not limited to, mobile phone, smartphone, tablet computer, laptop computer, wearable device, or any other computing device.

In one or more embodiments, the mobile device 212 can be communicatively coupled to a virtual reality headset that can display panoramic or 360 degree video content received from either the core video content server 202 or edge video content server 206. In some embodiments, the core video content server 202 can send the edge video content server 206 (e.g. edge cloud server) to present to mobile device 212 to the virtual reality headset communicatively coupled to the mobile device 212. In some embodiments, either the core video content server 202 or the edge video content server 206 can provide a portion of the panoramic video content to the mobile device 212 over the communication network(s) 204, 208, 210. A video player software application on the mobile device 212 can render the portion or part of the portion of the video content on the display of the virtual reality headset to be viewed by the user 214. In further embodiments, the core video content server can determine a motion-to-update latency between a core video content server 202 and the mobile device 212. Note, the motion-to-update latency between a core video content server 202 and the mobile device 212 or the motion-to-update latency between an edge video content server 206 and the mobile device 212 can be determined by sending a portion of video content (or in some embodiments, the entirety of the video content). In some embodiments, the portion of the video content that is used to determine motion-to-update latency from a server (core or edge) to the mobile device can be a portion that corresponds to a user's current field of view.

In one or more embodiments, a motion-to-update latency comprises a time between detecting user motion of the virtual reality headset and display local rendering of the panoramic video content based on the user motion (e.g. any remaining part of any portion not already rendered by the video player software application of the mobile device 212 on the display of the virtual reality headset), a time between sending the request for a portion of the video content according to the user motion by the mobile device and receiving the request by a server, a time for processing the video content (by the video content server) according to the request, a time between sending the portion of the video content by the video content server and receiving the portion of the video content by the mobile device 212, a time for processing and display the portion of the video content by the mobile device 212 (using the video player software application).

In one or more embodiments, the core video content server 202 can determine the first motion-to-update latency exceeds a threshold. Further, the can be a time the user 214 would have a below average quality of experience (QoE) or the time in which the user will begin to see a black area on the display of the virtual reality headset due to the video player software application of the mobile device having no buffered portion of the panoramic video content to render to the display of the virtual reality headset.

In one or more embodiments, the system 200 can include multiple edge video content servers that can provide video content to the mobile device 212. In further embodiments, the core video content server 202 can determine a motion-to-update latency for each of the multiple edge video content servers resulting in a plurality of motion-to-update latencies. In additional embodiments, the core video content server 202 can identify that one of the motion-to-update latencies associated with one of the edge video content servers 206 is below the threshold. In other embodiments, the core video content server 202 can identify the edge video content server 206 associated with the motion-to-update latency below the threshold.

In one or more embodiments, the core video content server 202 transmits the panoramic video content to the edge video content server 206. In further embodiments, the edge video content server 206 can provide a portion of the panoramic video content at different time intervals to the mobile device 212. In additional embodiments, the edge video content server 206 can provide a portion of the panoramic video content in response to receiving a request for the portion of the panoramic video content from the mobile device 212. Regions of the panoramic video content can be indexed by a motion index number. The request from the mobile device 212 can include a motion index number that indicates the portion of the video content. The edge video content server 206 can provide the portion of the video content according to the motion index number.

In one or more embodiments, the edge video content server can crop the video content to include the portion of the video content that is indicated by the motion index number included in the request. Cropping the video content includes the requested portion as well as additional margin area surrounding the requested portion such that the video player software application at the mobile device 212 has enough of the video content to locally render the margin area to the user 214 if the user's viewpoint changes before an additional portion of the video content is provided to the mobile device 212 to prevent the user to view blacked out sections of the virtual reality headset display. In some embodiments, the edge server crops the portion of the video content prior to providing the portion of the video content to the mobile device. The portion of the video content comprises a margin area and the edge server determines the margin area according to previous portions of video content provided to the mobile device.

In one or more embodiments, the core video content server 202 or the edge video content server 206 determine the motion-to-update latency for itself or for the edge video content server. Different streaming protocols such as real-time messaging protocol (RTMP) and real-time transportation protocol (RTP) may be associated with different motion-to-update latencies due to the way in which they each process and stream video content data. The core video content server 202 or the edge video content server 206 can select one of the multiple streaming protocols by selecting the streaming protocol associated with the lowest motion-to-update latency. In some embodiments, the core video content server 202 provides instructions to the edge video content server 206 to stream the video content using the selected streaming protocol.

Figure 2B:
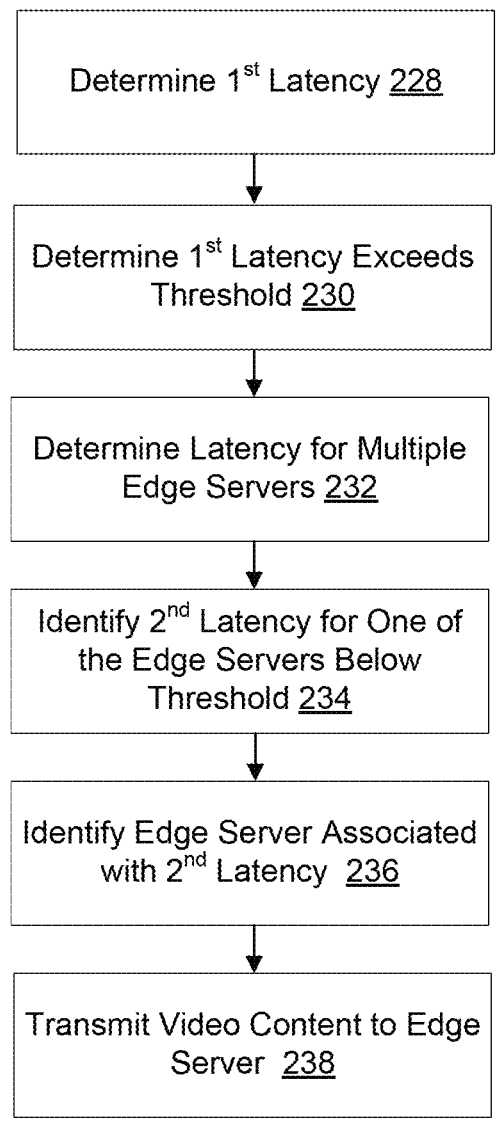
FIGS. 2B-2D depict illustrative embodiments of methods in accordance with various aspects described herein.
Figure 2C:
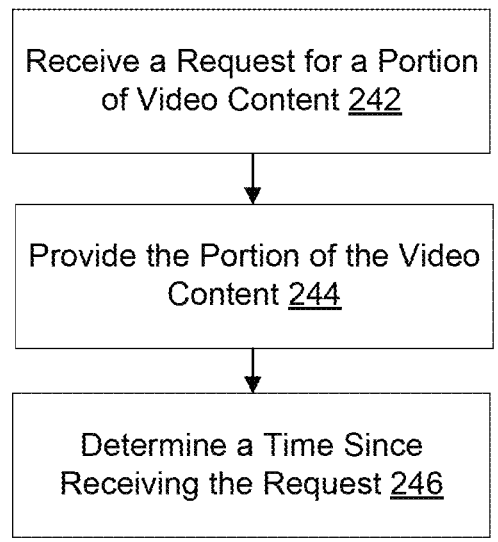
Figure 2D:
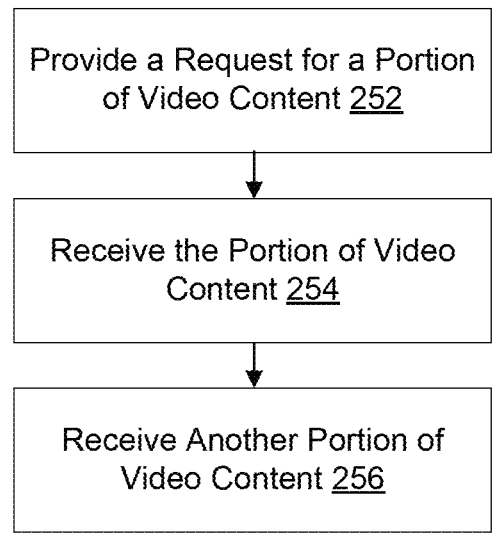

FIGS. 2B-2D depict illustrative embodiments of methods in accordance with various aspects described herein. Referring to FIG. 2B, in one or more embodiments, the method 220 can be implemented by a video content server. The method 220 can include, at 228, the video content server determining a first motion-to-update latency of a mobile device in relation to receiving a video content update provided by a video content server. Further, the method 220 can include, at 230, the video content server determining that the first motion-to-update latency exceeds a threshold. In addition, responsive to determining that the first motion-to-update latency exceeds a threshold, the method 220 can include, at 232, the video content server determining a motion-to-update latency of the mobile device in relation to receiving video content updates from a plurality of edge servers. Such determining results in a plurality of motion-to-update latencies. Also, the method 220 can include, at 234, the video content server identifying a second motion-to-update latency from the plurality of motion-to-update latencies that is below the threshold. Further, the method 220 can include, at 236, the video content server identifying an edge server associated with the second motion-to-update latency. In addition, the method 220 can include, at 238, the video content server transmitting video content to the edge server to mitigate the first motion-to-update latency of the video content server. The edge server provides a portion of the video content at different time intervals to the mobile device resulting in a plurality of portions of video content. The video content comprises panoramic video content.

In one or more embodiments, the mobile device is communicatively coupled to a virtual reality headset for presentation of the video content. In further embodiments, each of the plurality of motion-to-update latencies is determined according to a first time between detecting user motion of the virtual reality headset and display local rendering, a second time between sending a request from the mobile device for a content update and receiving the content update, a third time for processing the content update, a fourth time between sending the content update and receiving the content update at the mobile device, a fifth time for processing and display the content update by the mobile device, or any combination thereof. In additional embodiments, the request includes a motion index number, wherein the motion index number identifies a portion of the content update being requested, and wherein the edge server crops the video content to include the portion of the content update.

In one or more embodiments, the video content server can select a streaming protocol from a plurality of streaming protocols for use by the edge server, and wherein the streaming protocol being selected results in the edge server having the second motion-to-update latency. In further embodiments, the edge server provides to the mobile device the portion of video content using the selected streaming protocol. In other embodiments, the edge server crops the portion of the video content prior to providing the portion of the video content to the mobile device. Further, the portion of the video content comprises a margin area. In addition, the edge server determines the margin area according to a plurality of previous portions of video content provided to the mobile device.

Referring to FIG. 2C, in one or more embodiments, the method 240 can be implemented by an edge server. The method 240 can include, at 242, the edge server receiving a request for a portion of video content from a mobile device. Further, the method 240 can include, at 244, the edge server providing the portion of the video content to the mobile device, wherein the video content comprises panoramic video content. A video content server transmits the video content to the edge server in response to determining a motion-to-update latency for the edge server is below a threshold. In addition, the method 240 can include, at 246, the edge server determining a time since receiving the request.

In one or more embodiments, the mobile device is communicatively coupled to a virtual reality headset that presents the portion of the video content. In further embodiments, the motion-to-update latency is determined according to a first time between detecting user motion of the virtual reality headset and display local rendering, a second time between sending a request from the mobile device for a content update and receiving the content update, a third time for processing the content update, a fourth time between sending the content update and receiving the content update at the mobile device, a fifth time for processing and display the content update by the mobile device, or any combination thereof.

In one or more embodiments, the request includes a motion index number, the motion index number identifies a portion of the content update being requested, and the edge server crops the video content to include the portion of the content update. In further embodiments, the portion of the video content comprises a margin area and the cropping of the video content comprises determining the margin area according to a plurality of previous portions of video content provide to the mobile device.

In one or more embodiments, the providing the portion of the video content comprises the providing the portion of the video content using a selected streaming protocol. The video content server identifies the selected streaming protocol according to the motion-to update latency of the selected streaming protocol.

Referring to FIG. 2D, in one or more embodiments, the method 250 can be implemented by a mobile device. The method 250 can include, at 252, the mobile device providing, by a mobile device comprising a processor, a request for a portion of video content to an edge server. The request includes a motion index. Further, the method 250 can include, at 254, the mobile device receiving, by the mobile device, the portion of video content from the edge server according to the motion index. The edge server is selected from a plurality of edge servers by a video content server according to a motion-to-update latency of the edge server being below a threshold. In addition, the method 250 can include, at 256, the mobile device receiving, by the mobile device, another portion of the video content from the edge server.

In one or more embodiments, the mobile device is communicatively coupled to a virtual reality headset for presentation of the video content. In further embodiments, the motion-to-update latency is determined according to a first time between detecting user motion of the virtual reality headset and display local rendering, a second time between sending a request from the mobile device for a content update and receiving the content update, a third time for processing the content update, a fourth time between sending the content update and receiving the content update at the mobile device, a fifth time for processing and display the content update by the mobile device, or any combination thereof. In additional embodiments, the edge server provides the portion of video content using a selected streaming protocol that results in the motion-to-update latency of the edge server.

While for purposes of simplicity of explanation, the respective processes are shown and described as a series of blocks in FIGS. 2B-2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Further, a portion of the embodiments described herein with portions of other embodiments described herein.

In one or more embodiments, a mobile virtual reality system that uses a mobile edge cloud to deliver latency sensitive applications on mobile devices over cellular networks. In some embodiments, the mobile virtual reality system keeps track of motion-to-update latency. In further embodiments, a detailed end-to-end latency can be broken down for a low latency VR application like 360 video accessed over wireless networks. In other embodiments, by leveraging a mobile edge cloud (MEC), the 360 application on the can be implemented by the MEC and realized a low latency real-time control loop. Embodiments can include improve various system components, streaming protocols and codec parameters to reduce the motion-to-update latency. In some embodiments, the motion-to-update latency can be reduced from more than 1 second to less than 200 ms. In some embodiments, show the MEC-VR system performing if the VR server is situated in a distant central or regional cloud data center. In addition, by replaying typical user viewing patterns of 360 degree video content from a large public corpus, embodiments can achieve up to 75% of bandwidth savings and maintain a high quality of experience.

In one or more embodiments, the popularity of virtual reality (VR) in recent years has created a new market for head mounted VR devices with shipments topping more than 1 million in third quarter of 2017. In today's technology, the wearable VR headset relies on a multi-Gbps HDMI cable to stream display frames from a powerful PC. The mobile cellular industry is also making a leap from 4G to 5G promising even higher bandwidths and low access latencies. The juxtaposition of immersive computing and advanced wireless technologies is creating a unique opportunity to provide untethered VR solutions. Embodiments try to maintain the high quality VR experience that users expect from a wired/tethered solution replicated to a wireless environment.

In one or more embodiments, the power and compute limitation of current mobile hardware forces the mobile VR system to offload some or all of its computations to a wirelessly connected server. In some embodiments, designing a remote rendering system has always been on how to fill the gap between the actual latency of sending server updates over network and the perceived latency by the end user.

Figure 2E:
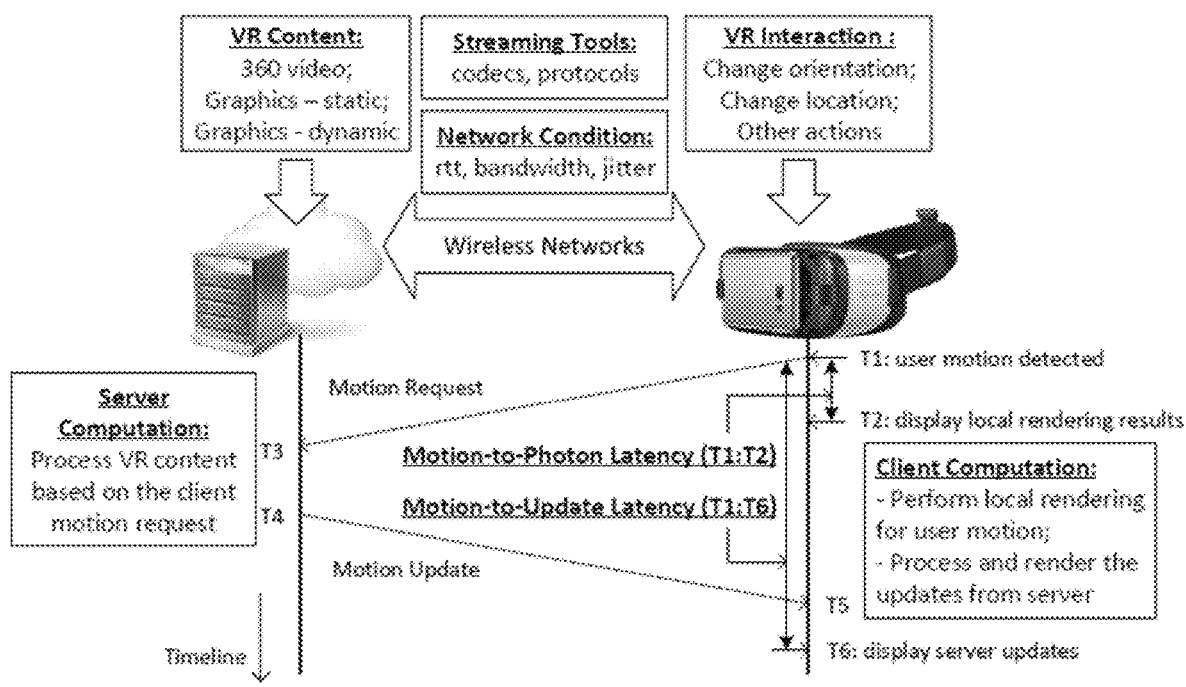
FIGS. 2E-2X depict illustrative embodiments of a system functioning within the communication network of FIG. 1 in accordance with various aspects described herein.

In one or more embodiments, there are two types of latencies as illustrated in FIG. 2E. They are motion-to-photon latency and motion-to-update latency. Motion-to-photon latency is the time needed for a user movement to be locally rendered on the VR headset. For mobile VR, the head mounted display is in particular sensitive to the motion-to-photon latency. In some embodiments, the motion-to-photon latency for VR displays can be less than 20 msec before the user can actually feel the delay. Motion-to-update latency comprises of the entire time (T1 to T6) it takes for a user movement to be sent back to the server, processed and returned to the headset for scene update. In other embodiments, reduce the motion-to-photon latency by enabling local rendering in the client (mobile) device so that it can directly respond to user interactions without having to wait for the server update. In the case of mobile VR, in some embodiments, use the approach by rendering foreground objects and background environment maps locally on the mobile device. Embodiments address the components of the motion-to-update latency and reducing this latency, the impact if the motion-to-update latency is not reduced or too long, and the use of any prediction or pre-fetching methods to overcome long motion-to-update latency (exceeding a threshold).

One or more embodiments can include a VR system running on actual mobile devices and wireless networks. Further, the embodiments can measure the latency breakdown as seen by the different system components. In some embodiments, using various configuration parameters and reduction methods, the motion-to-update latency can be reduced at the cost of reducing buffer size and increasing bandwidth usage. Predicting headset user movements or using extra network bandwidth to prefetch video tiles can reduce motion-to-update latency to a certain extent. Not reducing the motion-to-update latency can lead to a vicious cycle: the server needs to send more data for every motion update in order to support client local rendering for a longer period of time, while the extra data requires more resources for transmission and processing, which will further increase the motion-to-update latency.

One or more embodiments can include a latency driven approach for designing a mobile VR system, which can be called MEC-VR. Some embodiments can include a mobile edge cloud (MEC) equipped with 4G cellular LTE technology that MEC-VR can leverage for offloading VR computations. By virtue of the MEC physically being closer to the end user, embodiments can shave a significant amount of latency by moving the VR server from a distant central cloud to the MEC. Further embodiments include reducing delay from various system components, streaming protocols and codec parameters. Embodiments reduce the motion-to-update latency from more than 1 second to less than 200 ms. Other embodiments can include the MEC-VR where the VR server is situated in a central or regional cloud data center.

Further embodiments can include 360 video content to demonstrate how MEC-VR splits the computation between server and client following the basic guideline of the server should generate the data that is sufficient for the client to perform local rendering for the period of time that equals to the motion-to-update latency. Other embodiments can include intelligently adding motion prediction and prefetch techniques into MEC-VR to reduce bandwidth usage and network jitter issues. MEC-VR can be evaluated over both wireless (WiFi) and cellular (LTE) access technologies using a real MEC setup. Further embodiment can include replays a large corpus of users' headset movement data to quantify the amount of bandwidth savings obtained in MEC-VR while retaining a high quality of experience (QoE). The traditional PSNR values as a metric to quantify QoE objectively.

Embodiments can include a detailed breakdown and analysis of the latency and propose techniques to reduce it and leverage these techniques to deploy a 360 video streaming application. Techniques can also be utilized for optimizing other low latency applications. Further, embodiments can include a MEC deployment along with Android devices. In addition, embodiments include user viewing patterns of 360 video content show that 75% bandwidth savings with high PSNR values.

Figure 2F:
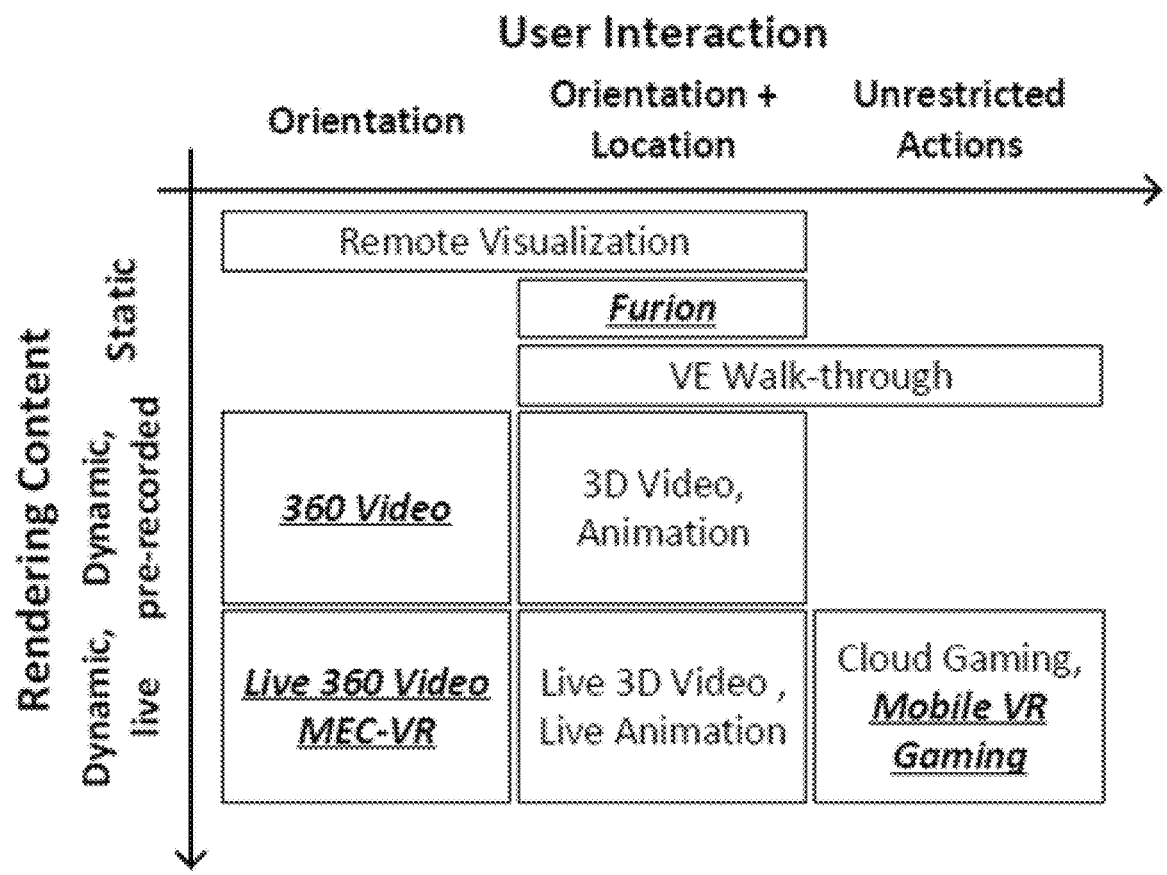

Embodiments can include offloading rendering computation to a remotely connected server was initially proposed to share graphics processing resources over networks when computers were not powerful to run graphics rendering. Further embodiments can include remote rendering systems based on the rendered content and user interaction methods. Referring to FIG. 2F, the axis of rendered content, static content can be easy to process as it does not change over time. Pre-recorded dynamic content needs to be refreshed every frame but can still benefit from pre-processing and prefetching. Embodiments can include live dynamic content has to be processed in real time. The user interaction axis starts from changing viewing orientation, which is widely supported by mobile VR headsets equipped with a gyroscope. However, gaming usually requires the system to support more difficult interaction methods which cannot be supported with same processing approach as 360 video content. From FIG. 2F, one can conclude that: (i) using mobile VR to watch 360 video is a relatively simpler problem than using mobile VR to play games, and (ii) recent work on mobile VR partially addresses the VR gaming problem by assuming that the world's background is static and can therefore be prefetched. However, in more realistic complex games, both foreground and background are constantly changing and cannot easily be separated (e.g., shadows).

Although there are no existing solutions that can be directly applied to a mobile VR system that not only supports 360 video content but also various gaming applications, the design philosophy remains the same. First, embodiments reduce the overall end-to-end system latency. Second, the client needs to perform local rendering to cover the gap before the server motion updates arrive. While the environment map is sufficient to cover the local rendering for changing view orientations, complex image based rendering or 3D graphics rendering is needed at the client for other interactions.

360 video content can be used interchangeably with VR. 360 video content is only an entry level application for mobile VR. Techniques proposed in recent 360 streaming works do not necessarily translate to a more general purpose mobile system for gaming. Embodiments can include 360 video content streaming to focus on bandwidth saving, or bandwidth driven strategies. This is because streaming 360 video content requires much more bandwidth than streaming normal video of the same quality. The most popular 360 video content representation applies the equirectangular projection to the spherical view and encodes the 360 video as regular rectangular frames using standard codecs (e.g., H.264, MPEG-4, etc.). Even though the 360 video content is recorded in high resolution (e.g., 1080p, 4 k), the pixels are spread out in the sphere to capture objects in all directions. After rendering, the 360 video for a specific viewpoint, the 4K 360 video is only equivalent to the TV resolution at 480p. Moreover, such characteristics of 360 video not only adds burden to network streaming, but also makes it a computationally challenging task to decode and render 360 video on mobile devices. The focus of some embodiments center around the design of a mobile VR system (taking 360 as an application) and reducing the latency.

Embodiments can include a tile based approach. The tile based 360 video streaming divides the equirectangular projected 360 video content into different tiles. Based on the viewpoint of the user, selected tiles of the whole 360 video content is sent to the client for decoding and rendering. Some embodiment include a framework for tiling and rendering the 360 video content in Field of View (FoV) but does not address latency issues. In other embodiments spherical video is mapped onto an equirectangular video, cut into 8×8 tiles. Further embodiments can include delivery of tiles based on prediction of head movements.

Embodiments can include a projection based approach. Projection based 360 video content streaming aims to find a better projection mapping (i.e., cube map, pyramid projection) rather than equirectangular. These new projections can also render the viewing region at high quality while recording the invisible region in lower quality.

Embodiment can include an encoding based approach. Layered 360 video encoding creates two video layers: the base layer is a low quality representation of the whole 360 video and the enhancement layer provides additional quality to the region that the viewer is looking at. Some embodiments can include a combined prediction and a layered encoding strategy whereby tiles are encoded with different quality levels. Other embodiments can include an interactive 360 video content system that jointly investigates both panoramic video compression and responsive video stream rate control.

The main difference between the latency driven design and other 360 video content streaming approaches is that some embodiments do not rely on the accurate viewpoint prediction to maintain a consistent and acceptable QoE. Bandwidth driven approaches are designed to take advantage of the mature HTTP Adaptive Bit Rate (ABR) streaming solutions. While HTTP ABR streaming algorithms have proven effective by using the available bandwidth to deliver the best possible video quality, this may not be effective for very high quality 360 streaming or VR gaming more generally. Without reducing the motion-to-update latency, bandwidth driven approaches can waste network bandwidth. In addition, when the viewpoint prediction fails or does poorly, unnecessary pixels are sent that can deteriorate the latency and ultimately degrade the end-to-end QoE.

Mobile edge computing has been the subject of both academic and industrial efforts. Embodiments can include SDN-based architectures that can inspect and offload some or all traffic to MEC servers. Other embodiments include a service abstraction framework that enables low latency interactive applications on edge clouds in mobile networks. For distributed deployments, guidelines are defined as to where to place these MEC servers to guarantee high scalability and availability of computer and storage resources close to the end user.

While 5G specification calls for low latencies of 1 ms or less and high throughput, existing LTE networks may not meet the requirements of low latency and high throughput applications such as VR/360. To address this embodiments can include a latency driven design by leveraging a MEC to provide the exact 360 video frame that the user wants to view by incorporating a real-time feedback loop to track the user's head movement.

Embodiments can include latency estimation in remote rendering to breakdown the latency to individual components (i.e., motion request transmission, server processing, motion update data transmission, and client processing), run individual micro-benchmarking for each component and then sum to obtain total latency. Other embodiments can include a mobile VR system that plays 360 video content using widely used technologies on Android mobile phones and measure the actual latency from the real system.

Figure 2G:
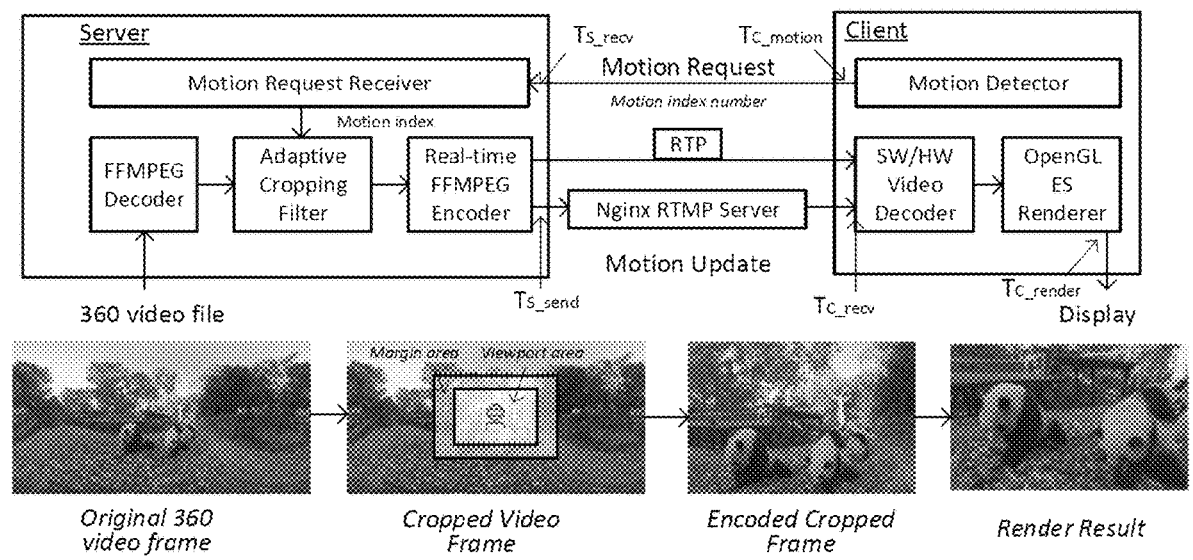

Referring to FIG. 2G, the embodiments of the system include a server and a client connected through either Wi-Fi (802.11ac) or commercial LTE. The server reads the 360 video content at 4K resolution from local disk, decode the original video content with FFMPEG1, apply an adaptive filter that crops video frame to the resolution of 1080p, encode the cropped frames using the designated codec, and send the encoded data to the client. The adaptive cropping filter, which is custom built to dynamically change the cropping parameters based on the region assigned by the motion receiver module. The client runs on an Android mobile device (e.g. Samsung Note 8). It receives the data from server, decodes the video using a FFMPEG-based video player that supports both software and hardware decoding, and uses the decoded frame data as the texture map for VR rendering. The client also monitors both the gyroscope and the touch screen events at 100 Hz sampling rate, analyzes the viewpoint movement, determines what cropping region to apply and notifies the server when a change happens.

Note that in this system, the cropped video frame is the motion update generated on the server. The client relies on the cropped video frame to perform local rendering before the next update arrives. Therefore, the cropping frame should at least include all the viewport area 2 and some extra margin area around. The goal is to put enough margin in the cropped frame so that the client always has enough pixels for local rendering even if the viewpoint changes. In this system the motion detection can be the yaw movement and predefine 6 cropping regions are in FIG. 2H. Therefore, the server and client exchange motion index number to notify the change of cropping region.

In order to measure the latency of each component, a timestamp can be added in every step of the whole process from send to decode. On the server side, the data structure of video packet can be modified to carry the timestamp at which the motion index is first received at the server (Ts_recv) over the pipeline to match the time at which the server sends the frame (Ts_send). On the client side, additional data structures are added to record all timestamps of the same video frame because the video frame is passed from the video player (native C code) to the VR player (Java code). Changes to the streaming protocol are made to insert the motion index number for every video frame sent from server to client, which allows the client to identify the first video frame that is cropped based on the updated motion index number.

Following the FFMPEG streaming guide, configurations can be tuned for the FFMPEG on both the server side and the client side to reduce the latency. Note that even if the server reads the video file from local disk, the processing speed is forced at the video's frame rate because of the parameter "-re" being used. The configuration parameters are explained in FIG. 2I and the detailed results are shown in FIG. 2J.

Buffering is one factor that can add an amount of latency but can also be reduced. The test MPEG-4 original shows that the packet can arrive as soon as 41 ms but the decoding will not start about 1 seconds later. This is because the video player is maintaining a 1 second buffer. Buffer has been widely used in video streaming applications to filter out fluctuations in the network to ensure smooth playback. In typical HTTP DASH streaming, the video player usually maintains a buffer up to 30 seconds. However, buffer is not a friend to remote rendering systems and should be minimized to avoid contributing to the motion-to-update latency. FFMPEG has a parameter "-probesize" that can significantly reduce the buffering delay when setting to a small number (test MPEG-4 rtp). Note that some buffer is required by the codec and cannot be reduced. For example, when B frames are used, there must be a small buffer to reorder the frames for correct playback. Assuming there are two B frames between every I/P frames, the reorder buffer must hold at least three frames, that will add 90 ms delay. To reduce such buffer, the only option is to avoid creating any B frames on the server side.

The selection of streaming protocols can affect the latency. Embodiments can compare two protocols designed for real time streaming: RTMP and RTP]. Embodiments can include a patch to FFMPEG to make RTMP support MPEG-4 codec. In some embodiments the TCP based RTMP can outperform the UDP based RTP in terms of latency. For RTP protocol, FFMPEG needs to read and process every datagram packet in the user space. For RTMP, FFMPEG gets the frame size from frame header and makes only one TCP read call. The actual packet reading and handling happens in the kernel space. The difference between network I/O itself is not significant but it causes FFMPEG to set different internal queuing sizes between the video reading thread and the decoding thread, which increases the queuing delay of RTP. Second, the video reading thread for RTP only releases the video frame when the first packet of the next frame arrives, which contributes to another 30 ms delay.

Internal queuing can be another big latency factor. Modern video players like FFMPEG/FFPlay put video reading, decoding and displaying into three separate threads to prevent I/O blocking and uses system resources maximally. Internal queues are frequently used when passing video data between threads. Increasing the queue size can potentially avoid packet loss and frame drop but it also increases the latency. FFMPEG provides a parameter "-no-buffer" to reduce the queue size.

Codec can be another factor in latency. By default, the video player takes advantage of the hardware to decode the H.264 stream. The hardware codec is designed to decode one video frame every 33 ms if it can be assumed the frame rate is 30 fps, but does not guarantee the delay between the video packet entering the hardware and the corresponding decoded frame coming out to be less than 33 ms. In using H.264 hw, it can be shown that the hardware pipeline delay can be as long as 400 ms which matches the configuration in the logs indicating that 15 frames are in the hardware pipeline. Embodiments can include the hardware to shorten the pipeline delay and to switch to the software codec for H.264 (test H.264 sw). In this case, the latency is reduced but the device is not able to decode the video at full frame rate. Therefore, other embodiments use MPEG-4, which is a more lightweight codec than H.264.

Moving the server further to the central cloud and connect through commercial LTE can increase latency. MPEG-4 LTE shows that not only the network delay is increased, which might also cause FFMPEG to set the internal decoding queuing size even higher. Increasing the video stream bit rates also hurts the motion-to-update latency (test mpeg-4 high-bitrate). The "Network" component in FIG. 2J includes not only the network round trip delay but also the time spent to read the first packet of the video frame. Reading more data naturally costs more time. Note that high bitrate not only hurts the motion-to-update latency, it also drives the down the video playback frame rate substantially.

When server receives the motion request, it needs to wait until the next frame is processed before it can apply the update for the new motion. This on average adds up a 16 ms delay. This is the main reason that it takes the server on average more than 20 ms to process the video frame. The sampling rate of the motion detector can also be a factor. Even at the 100 Hz sampling rate, it introduces on average 5 ms to the total latency.

Although the motion-to-update latency is not directly noticeable to the end user, embodiments show that long latency still has a big impact on the overall system performance. The main reason is that the client relies on the server updates to perform local rendering. Although such dependency varies upon the rendering content and the interaction methods, in general, the longer period of time the client needs to perform local rendering, the more data the server update should provide. In some embodiments increasing bandwidth causes the client to spend more time on receiving and processing data and thus degrade the motion-to-update latency, which will further increase the size of motion update if the client wants to maintain the same local rendering performance.

Embodiments of the mobile VR system define six cropping regions as listed in FIG. 2H. However, the size and position of crop region directly affects the user experience of the 360 video content. A crop region with a large margin area can lead to smoother and glitch-free experience but may reduce bandwidth savings and add networking/processing latency. However, the smaller margin area may not provide enough pixels to the client to accommodate user movement and lead to a jittery viewing experience. Margin size can lead to reducing latency and/or improve QoE when defining cropping regions.

Margin size can be calculated based on head movement traces collected while users watched typical 360 videos on a head-mounted display. Embodiments can use a publicly available dataset that consists of 52 users watching six different 4K 360 videos leading to a total of 312 head movement traces. Embodiments use spherical coordinates.

Figure 2K:
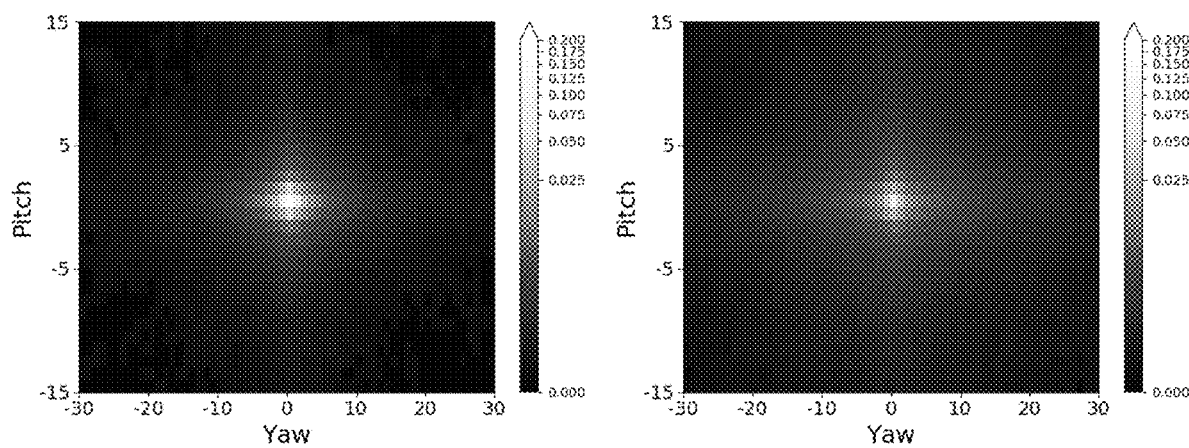

Referring to FIG. 2K (left), a plot of heatmap of change in user head orientations within a period of 100 ms is shown. The change in orientation is calculated for each recorded instant for all the 312 traces. Similarly, FIG. 2K (right) shows the change in user head orientation for a period of 300 ms. Most of the head movement is across the horizontal (yaw) and vertical (pitch) axis and few head movements are diagonal. Further, approximately 99% of head movements may lie in a region of 60° yaw margin and 30° pitch margin for 100 ms latency. For 300 ms latency, these number of samples is about 96%.

Figure 2L:
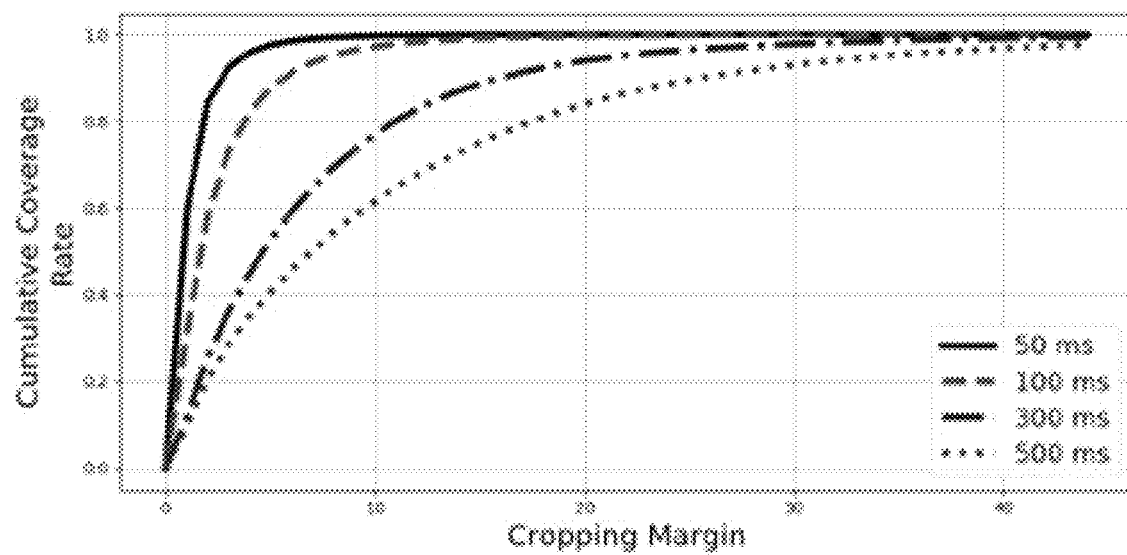

The performance of an optimal margin size can be calculated for different square dimensional regions. First, define a new metric coverage rate. Given a head movement $m_i$, the server can crop a frame $F_i$ based on the determined margin size M. If for the next period of time T, F, is sufficient to cover all head movements, $m_i$ is fully covered, or $C_i=1$. Otherwise if there is any head movement $m_j$ within the period of T that requires the pixels that are not provided in $F_i$, $m_i$ is not fully covered, or $C_i=0$. Thus, the coverage rate R can be:

$$R = \frac{\sum_{i \in N} C_i}{N} \quad (1)$$

where N is the total number of head movements in the trace. Given a head movement trace, R is usually determined by M and T. Referring to FIG. 2L, it shows the CDF of coverage rate vs. the margin size for different latencies. 99% coverage rate can be achieved by a crop region margin of 35° for 300 ms latency, whereas, only 15° margin is required when the latency is 100 ms.

There are many system components that affect the motion-to-update latency. Reducing buffers and queues can reduce the latency but also make the system vulnerable to network jitter and different QoS problems. Moving the server closer to the client can effectively reduce the latency caused by networks (i.e. selecting a server closer to the client to provide video content). The bandwidth usage needs to be carefully balanced. Using more bandwidth can deliver higher visual quality and better coverage rate but also degrades the motion-to-update latency and the overall system performance.

In some embodiments, prefetching and prediction are two techniques that are applied in 360 degree video applications and may reduce latency. In other embodiments, prediction alone may have no direct impact on the motion-to-update latency. In the above margin estimation case, correct prediction may help reduce the margin size required or increase the coverage rate with the same margin size. However, the incorrect prediction can also hurt the coverage rate and the computation time for prediction is also added to the overall latency. In further embodiments, pre-fetch together with prediction can reduce the motion-to-update latency when the pre-fetched content is actually used but also hurts the system performance if the pre-fetched content is not used. However, can be applied to differently in a mobile VR system.

Embodiments can include the design of MEC-VR. Embodiments can have the following design goals, (i) make the VR server as close to the VR client as possible to reduce network delay; (ii) optimize/reduce the bandwidth usage without sacrificing the viewpoint coverage; and (iii) mitigate the drawbacks (jitter, packet loss and frame drops) that are caused by minimizing video playout buffer size and internal queue lengths.

Figure 2M:
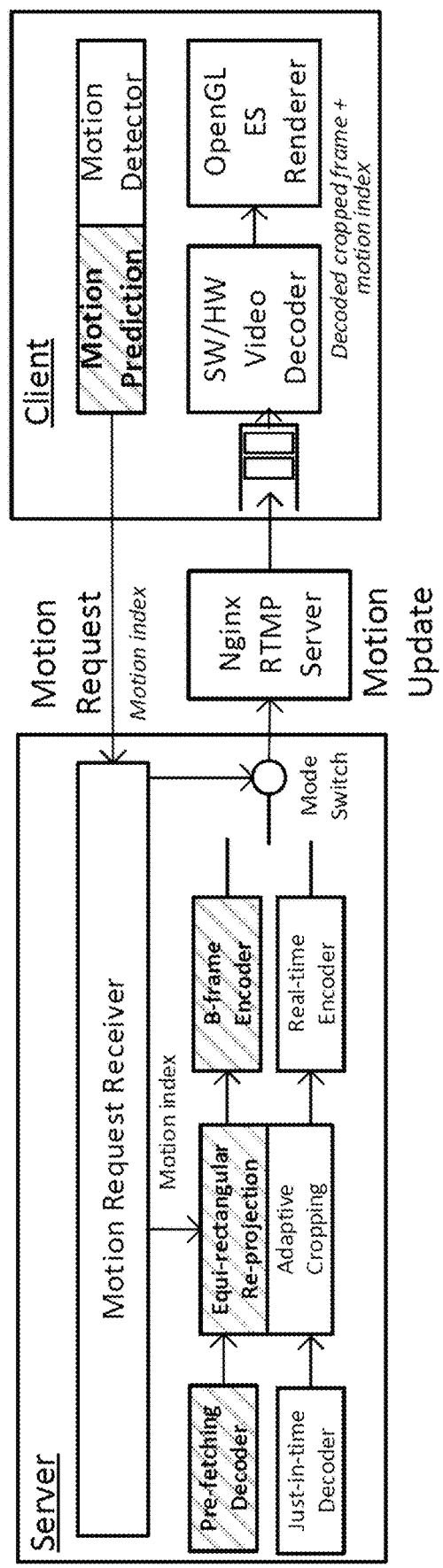

Embodiments can include a VR system based on the MEC-VR design. Further embodiments can include the latency optimization/reduction configurations and techniques described herein, including the use of RTMP instead of RTP, using MPEG-4 codec with no B frame encoding option (and keep H.264 as a comparison for evaluation), and minimizing the use of video buffer and internal queues for the client video player. In addition, embodiments can include some enhancements and add modules to achieve the design goals. FIG. 2M shows an illustration of the additional modules and further details.

Figure 2N:
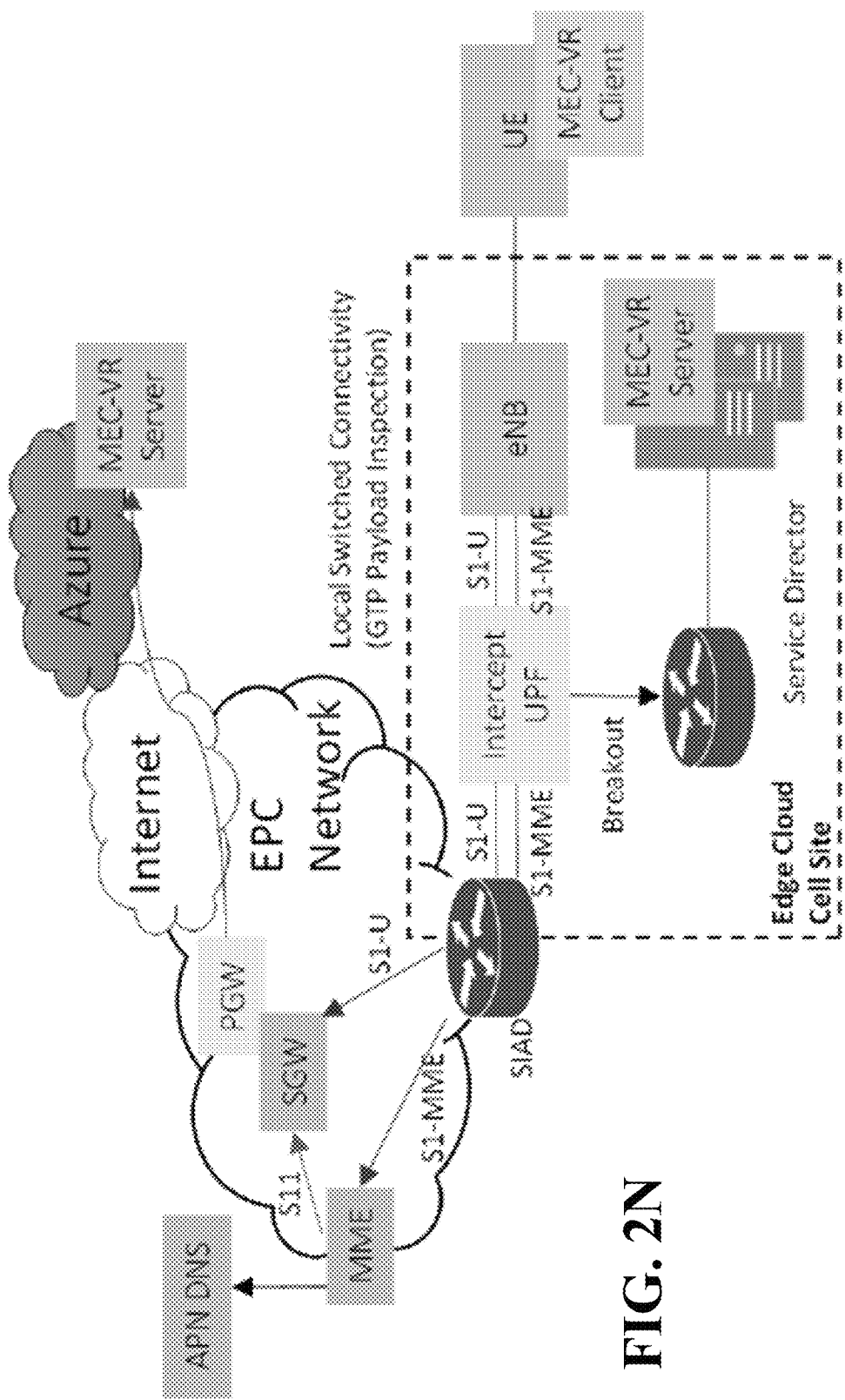
Figure 2O:
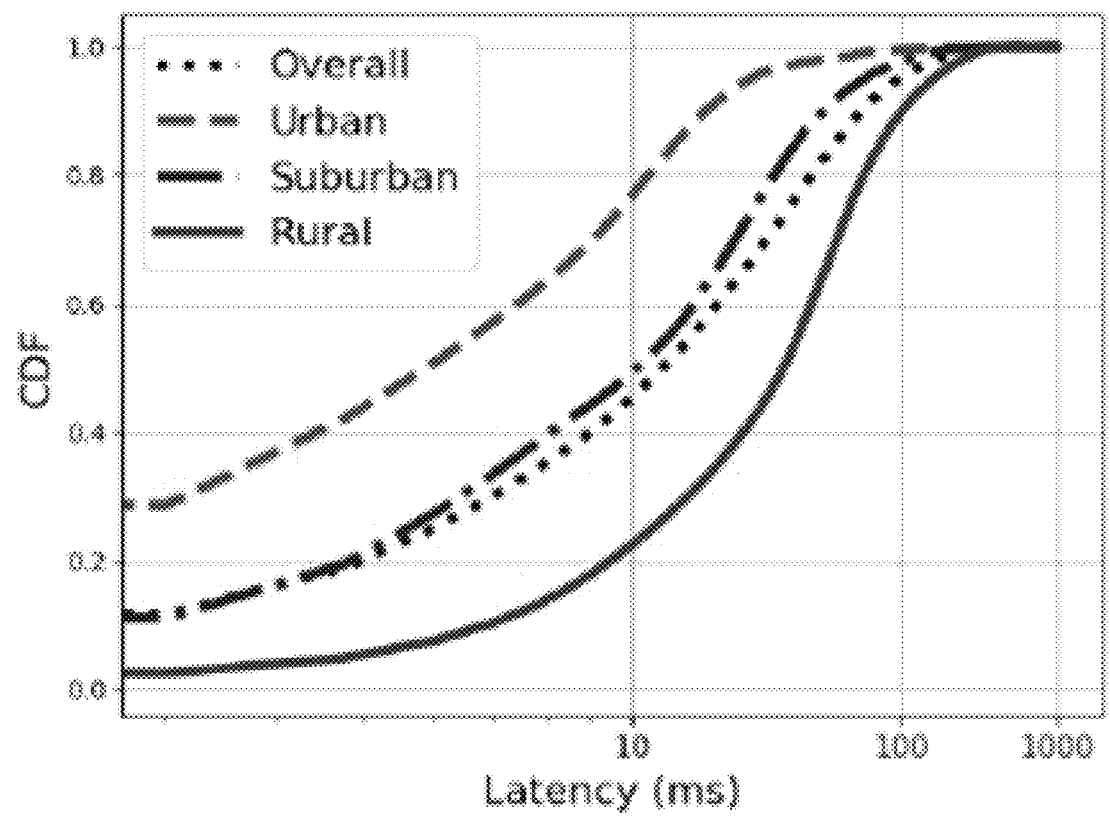

In one or more embodiments, which can include current LTE networks, a mobile device may exploit computing and storage resources of powerful distant centralized clouds, accessible through an enhanced packet core (EPC) network of a mobile operator and the Internet (See FIG. 2N). Accessing data from a distant cloud introduces long delays because data has to be sent back and forth from servers that are far away from the end users. To address the long latency, embodiments can include a mobile edge cloud where the compute and network resources are situated closer to the end users. To this end, embodiments can include a MEC that is collocated with the cell site/eNodeB. The VR server application is situated in the MEC and VR client application packets are routed locally to it via a short hop. The location of the MEC gives it a unique advantage over cloud servers situated in other distant locations. Some embodiments analyzed the round-trip latencies from a large US cellular operator comprising of over 80,000 cell sites connected via Ethernet/fiber backhaul to their respective central office. The latency distribution shows the delay between the cell site and the upstream central office it is connected to. It does not include the air interface delay between the mobile device and the cell site. The data is characterized for three different regions namely, rural, suburban and urban. 90% of cell sites situated in urban areas have latencies less than 20 ms whereas it is 90 ms for rural sites. The distribution (FIG. 2O) shows that if the server was moved to an urban central office, the round trip latency may increase by 20 ms. In some embodiments, the VR server was placed in many different locations namely, at the MEC (LTE-MEC) co-located with the cell site, an urban central office (LTE-CO), and Azure central cloud (LTE-Cloud). Note that Azure allows one to place servers in many different locations in the country. Some embodiments included a location in the west coast of US that is furthest away from the cell site.

MEC-VR captures both yaw and pitch motion. Some embodiments divide the whole sphere space into overlapping regions and the size of each region is configured based on the viewport size and the margin size. In particular, the margin size is dynamically adjusted based on the actual motion-to-update latency measured in the system.

When the motion detector module on the client detects the viewpoint movement and generates a new motion request, it sends the region index number together with the region size to the server. Upon receiving the motion request, the server uses the region information to crop video frames and sends the motion index information with every video frame back to the client. Besides using more regions to cover more viewpoint movements, MEC-VR also applies two techniques, motion prediction and improved cropping with high pixel density to enhance the generation of motion update data.

Figure 2P:
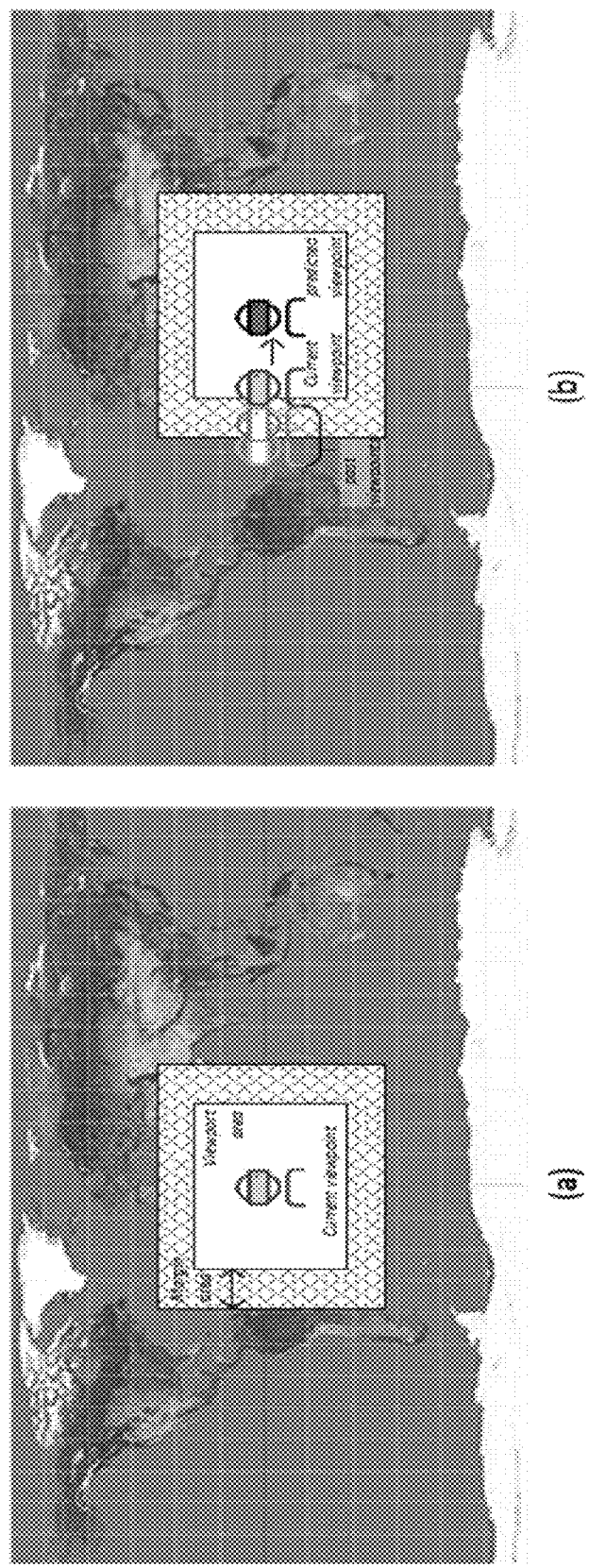

The idea of adding margin area to the current viewport frame is to assume that when the motion update is displayed on client after the motion-to-update latency, the actual viewpoint can still be covered by the margin area. Embodiments do a margin estimation and add a small margin area around the cropped region on all possible directions. However, if embodiments can accurately predict the moving direction of the viewpoint, there is no need to add the same margin in all directions. Rather, the pixels saved can be used to add extra margin areas in the direction of future viewpoints (See FIG. 2P).

In FIG. 2Q shows the impact of prediction on the coverage rate. The coverage rate is calculated on the head movement trace data. Embodiments include two techniques for prediction: (i) optimal prediction, i.e., when the exact head movement is known in advance, and (ii) speed-based prediction which calculates the future yaw/pitch values based on the exponential moving average of speed of head movement. Optimal prediction provides an upper bound on the coverage rate possible from a cropped region. The results indicate that the speed-based prediction yields 2% higher coverage rate than no prediction and matches the optimal prediction for a yaw/pitch margin of 30°/ang15.

The motion prediction described herein is different from the viewpoint prediction discussed in other 360 video streaming techniques. In those techniques, the prediction is usually trained by the user data to predict which part of the video is more likely to be watched by the user at a future time. In some embodiments, the motion prediction simply aims to predict the direction of user motion within a very short period of time that equals to the motion-to-update latency.

Figure 2R:
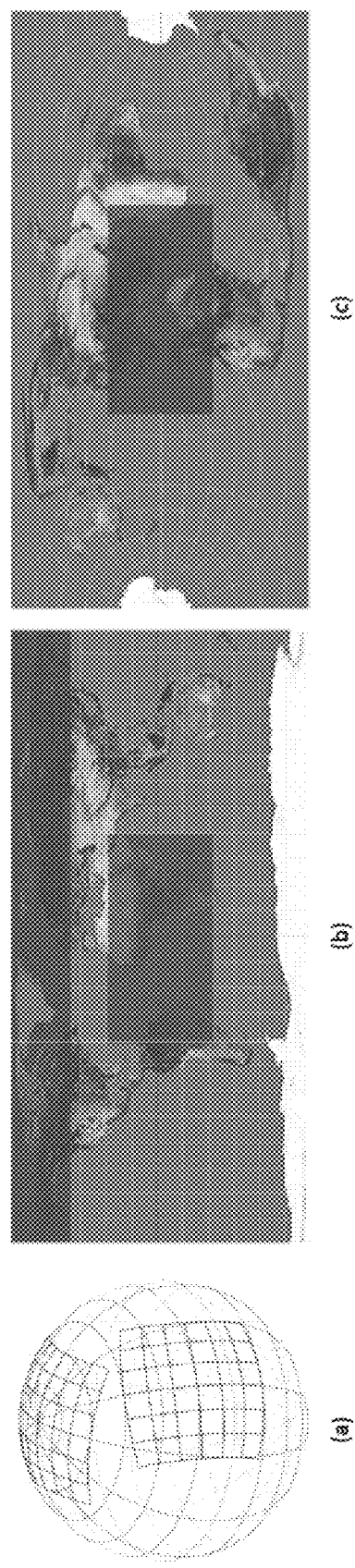

Given a region on the sphere, the server needs to generate the motion update data by cropping the original 360 video frame. However, depending on the projection filter the original 360 video uses, the pixel density may become a concern. For example, under the equirectangular projection method, the spherical region near the equator area has very different pixel density from the spherical region near the polar area as seen in FIG. 2R The MEC-VR system includes an Equirectangular Reprojection module on the server. This module re-projects the original 360 frame so that for any spherical region, the cropping region is derived from the area with highest pixel density. The re-projection is achieved by rotating the sphere to make the center of the target region fall on the new equator and then perform the same equirectangular projection. With re-projection, embodiments can make the cropped frame for every spherical region have the same resolution, and thus maintain a consistent bandwidth usage.

MEC-VR leverage a method of pre-fetching video to mitigate the impact of reducing the video playout buffer size. The reason for eliminating the playout buffer is to ensure that motion updates happen as soon as possible. However, the user does not necessarily change the viewpoint frequently and trace analysis shows that a viewer's viewport can remain in the same region for as much as 30 consecutive frames for some videos. The key idea behind pre-fetching is to take advantage of the unchanging viewpoint and create a short video buffer to address network jitter.

The server operates in two modes: "Just-in-Time" and "Pre-Fetching". In the "Just-in-Time" mode, the server processes every frame based on the actual received motion index. In the "Pre-Fetching" mode, the server processes a few frames ahead assuming those frames are in the same motion region as the current frame. These future frames can be encoded as B frames and sent out in burst before they are actually required by the client. The server switches to the "Just-in-Time" mode whenever a motion request is received and changes back to the "Pre-Fetching" mode whenever no motion request has been received for a period of time.

The biggest advantage of using pre-fetching is that the client can maintain a small buffer to reduce jitter. Note that the overall network bandwidth can also be reduced due to the use of B-frames. As long as the buffer time (calculated as the product of the number of frames in the buffer and the frame interval) is smaller than the motion-to-update latency, there is no need to discard any pre-fetched packet when the server switches from the "Pre-Fetching" mode to the "Just-in-Time" mode. The worst case happens when the user keeps changing the viewpoint and the server continues to stay in the "Just-in-Time" mode, so that it performs the same as if no pre-fetching method is applied. The 'Pre-Fetching' mode works with fine granularity and fetches only a few frames every time. It does not require any prediction of user viewpoint and does not waste any network bandwidth under any circumstances.

Embodiments include a MEC as shown in FIG. 2N. A packet interceptor implements local breakout and routes LTE packets to a 360 application server. This is a general MEC design mechanism whereby latency sensitive application packets are hook turned to a local application server situated close to the client. Other applications that are not latency sensitive are routed via the regular path onwards to the SGW and PGW. The PGW is connected to the Internet.

4G LTE maintains a separation between control and data packets. Control packets are sent to the Mobility Management Entity, (MME) and are used to connect the device to the eNodeB and help establish the initial radio bearer connection. Once connected, data packets then follow the red line via the S1U path for the regular path or the short circuited edge cloud path depending on the experiment.

Embodiments include conditions including transmission over WiFi, the eNodeB of the experimental LTE setup, and LTE network of a major carrier in the U.S. These include: WiFi: The clients are connected to a WiFi Access Point (AP). The AP is directly connected to the 360 application server using a high speed Ethernet cable. This scenario offers the shortest latency possible. (ii) LTE-MEC: The eNodeB of the experimental LTE testbed is connected to the 360 application server directly using a high-speed 1 Gbps optical link. (iii) LTE-Central Office (LTE-CO): The eNodeB is connected to the 360 server located approximately 60 miles away using an optical fiber. This scenario represents a typical metropolitan LTE deployment. (iv) LTE-Cloud: Utilize a server located in the public cloud in the Microsoft Azure cloud, U.S. West Region. (v) Commercial LTE: Use the commercial LTE network of a major carrier for benchmarking purposes.

Embodiments can include a Samsung Galaxy Note 8 phone as the client for the sake of consistency on client-side. Mobile devices support the latest hardware and software stack for video processing. Embodiments can include automated injection of viewport change events in the 360 application using the Android testing framework to generate a cropping region change every 1s.

Figure 2S:
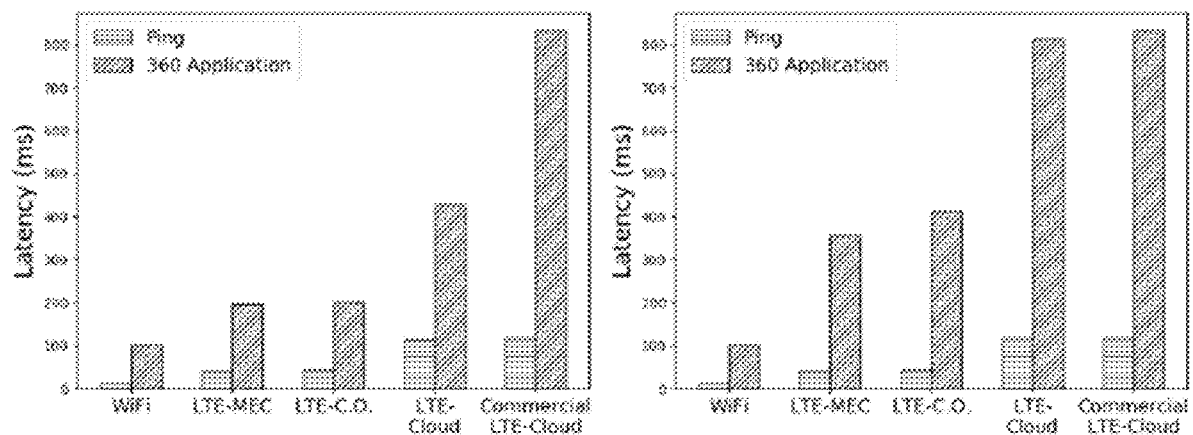

Embodiments evaluate the overall motion-to-update latency achieved for the different scenarios described above. For each scenario, embodiments include 3 different 4K quality 360 videos for a FoV of 90°×90° with cropping margins of 45° yaw and 15° pitch. FIG. 2S shows the average overall motion-to-update latency for 360 video and average ping latencies. The best case latency of roughly 100 ms is achieved for the WiFi scenario. On the other hand, the latency for commercial LTE, when the signal strength (RSRP) of the client is approximately −95 dBm, is typically more than 800 ms.

For the LTE-MEC scenario and the client at the cell center, the latency is 196 ms, which is roughly 2× higher than WiFi as shown in FIG. 11 (left). The latency from public cloud with client at center of the cell is 400 ms. When the client is at the cell edge, the LTE-MEC latency is 356 ms and about 4× higher than WiFi. Even in this challenging condition, this latency is roughly half of the latency achieved using Commercial LTE-Cloud. The latency for LTE-Cloud is slightly lower than that for Commercial LTE-Cloud.

Embodiments include the impact of margin on cropping regions and video encoding formats. Embodiments can choose two different encoding formats—MPEG4 and H264 for evaluations. Further embodiments include two cases for MPEG4 and H.264: (i) when there is no prefetching at the client, (ii) when prefetching of content is possible at the client. When prefetching is possible, the clients can take advantage of B-frames in the video stream, which may reduce the bandwidth requirement. The average PSNR of different encoding schemes is shown in FIG. 2T. The H264 codec provides higher PSNR than MPEG4. Furthermore, prefetching for both MPEG4 and H264 increases the PSNR.

Figure 2U:
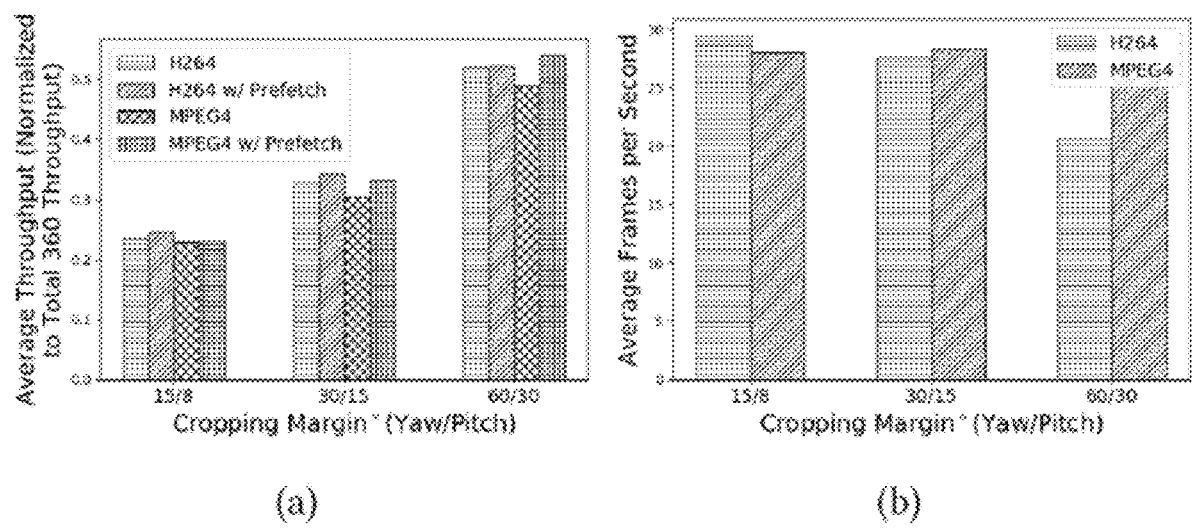

FIG. 2U (left) shows the throughput for H.264 and MPEG4 encoding with different cropping margins for the LTE-MEC scenario for a FoV of 90°×90°. The client was located at the cell center with RSRP approximately −75 dBm. For each case, embodiments averaged the throughput values for 3 different videos. The throughput values are normalized to the average throughput required for streaming the whole 360 video without cropping. H264 leads to slightly higher throughput than MPEG4 but also leads to slightly higher PSNR values as evident in FIG. 2T.

Embodiments show cropping leads to bandwidth savings. A yaw/pitch cropping margin of 15°/8° consumes about 25% of the overall bandwidth required to stream the whole 360 video. Even a higher yaw/pitch cropping margin of 60°/30° consumes 50% lower bandwidth than streaming whole 360 video.

FIG. 2U (right) shows the corresponding average frames per second (FPS) achieved. Note that while yaw/pitch cropping margin of 30°/15° is able to sustain the desired video frame rate of 30 frames per second, a 60°/30° margin leads to degradation in frame rate and stalling. This is due to higher latency incurred throughout the video processing pipeline as described herein.

Embodiments quantify the bandwidth savings for different client device form-factors for different cropping margin sizes in FIG. 2V for MPEG4 encoded video. Embodiments calculate these numbers based on the typical screen aspect ratio on smartphones and VR headsets. The aspect ratio of screen dictates the FoV area required for the cropping region. A cropping margin of 30°/15° can lead to almost 67% and 52% less bandwidth consumption compared to streaming the whole 360 video for a VR headset and a smartphone, respectively.

Embodiments evaluate the impact of cropping and encoding on visual quality of 360 video. Further embodiments emulate a user watching a 360 video based on headset movement traces. Additional embodiments generate the appropriate cropping regions based on headset movement data and identify the time periods when the user's headset does not render the desired viewport. While typical VR headsets have a small FoV of 70°×70°, embodiment include a larger viewport of 90°×90°.

Figure 2W:
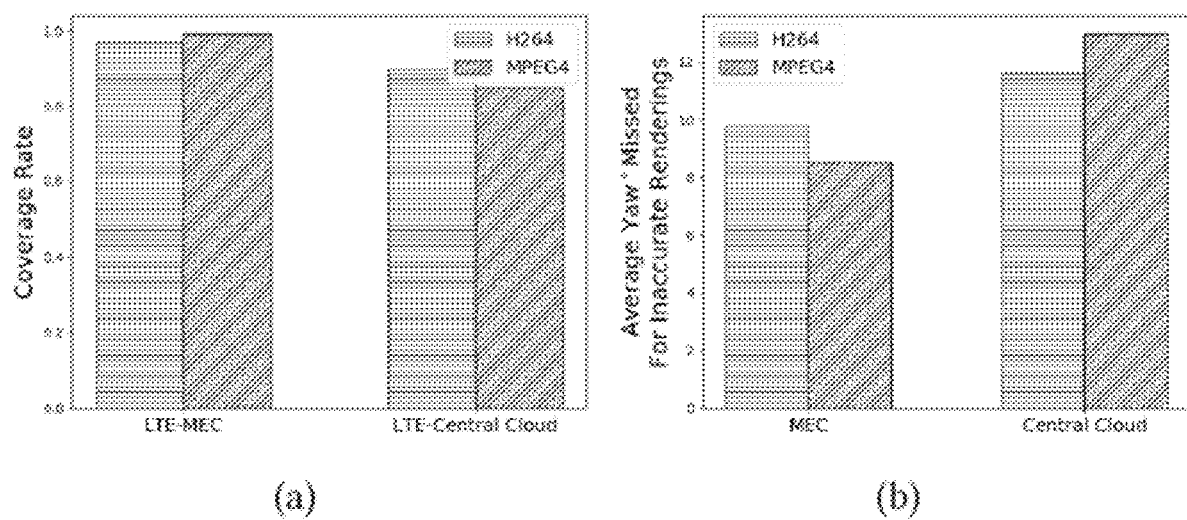

FIG. 2W (left) shows the coverage rate for headset traces. For the LTE-MEC scenario, approximately 97% and approximately 99% of trace points are rendered correctly for H264 and MPEG4, respectively. The better performance for MPEG4 is solely due to its lower motion-to-update latency. For LTE-Cloud, approximately 89% and approximately 84% of trace points are rendered correctly for H264 and MPEG4, respectively. Embodiments further quantify the sizes of the regions in the FoV that are incorrectly rendered.

FIG. 2W (right) shows the average yaw width of region not rendered correctly. For the LTE-MEC scenario, this width is roughly 9° which is 10% of the FoV width. For LTE-Cloud this number is approximately 12°. The average pitch width of region not rendered correctly was less than 2° in each case. The example of typical artifacts seen on the 360 video for pitch and yaw are shown in FIG. 2X.

Embodiments demonstrate that MEC-VR can achieve a motion-to-update latency of less than 200 ms by leveraging MEC. For streaming 4K 360 video, the low latency loop in MEC-VR can reduce the bandwidth consumption by approximately 75% when compared to streaming the whole 360 video. The performance artifacts observed for the MECVR video occur in less than 2% of viewpoints with only 10% of the video area rendered incorrectly.

Embodiments include being deployed in 4G LTE networks and with mmWave radios in 5G networks, which are expected to provide bandwidths up to a 1 Gbps. In such embodiments, even if the bandwidth ceases to be a bottleneck, the client side device hardware is not expected to improve proportionally. These mmWave networks can stream raw uncompressed data directly to the mobile enabling richer applications.

Embodiments include 360 video as an application for mobile VR, but other embodiment can include VR gaming scenarios as well. Motion-to-update latency can be addressed as it relies more on remote rendering. The mechanisms discussed herein can be applied to other, general VR system requirements.

Embodiments can include the 360 server side application was deployed on various infrastructure resources at different locations in a way that is in line with modern production deployment processes and methods. The applications can be run as Docker containers to leverage Docker's ease of deployment with fast startup times (equivalent to starting a process) and minimal runtime performance overhead. This is ideal for the on-demand scenarios where the application is launched onto the MEC resources upon client requests to view 360 video streams. Other embodiments can include deployment on a locality-aware Docker cluster using ONAP.

Embodiment include a mobile VR system that uses a mobile edge cloud to realize a low latency application like 360 video. Further embodiments demonstrated that with a careful latency reduction design, cellular devices and networks can indeed support latency sensitive applications. Embodiments provide a thorough latency breakdown analysis for each system component and identify components to reduce latency (e.g., transport protocol choice, reducing buffers, etc.) to deliver VR solutions with high quality of experience. Embodiments quantify the responsiveness and the bandwidth savings of a system that is obtained by replaying a large corpus of 360 head video movement data.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and methods 220, 240, and 250 presented in FIGS. 1, 2A, 2B, 2C, 2D and 3.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These VNEs 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
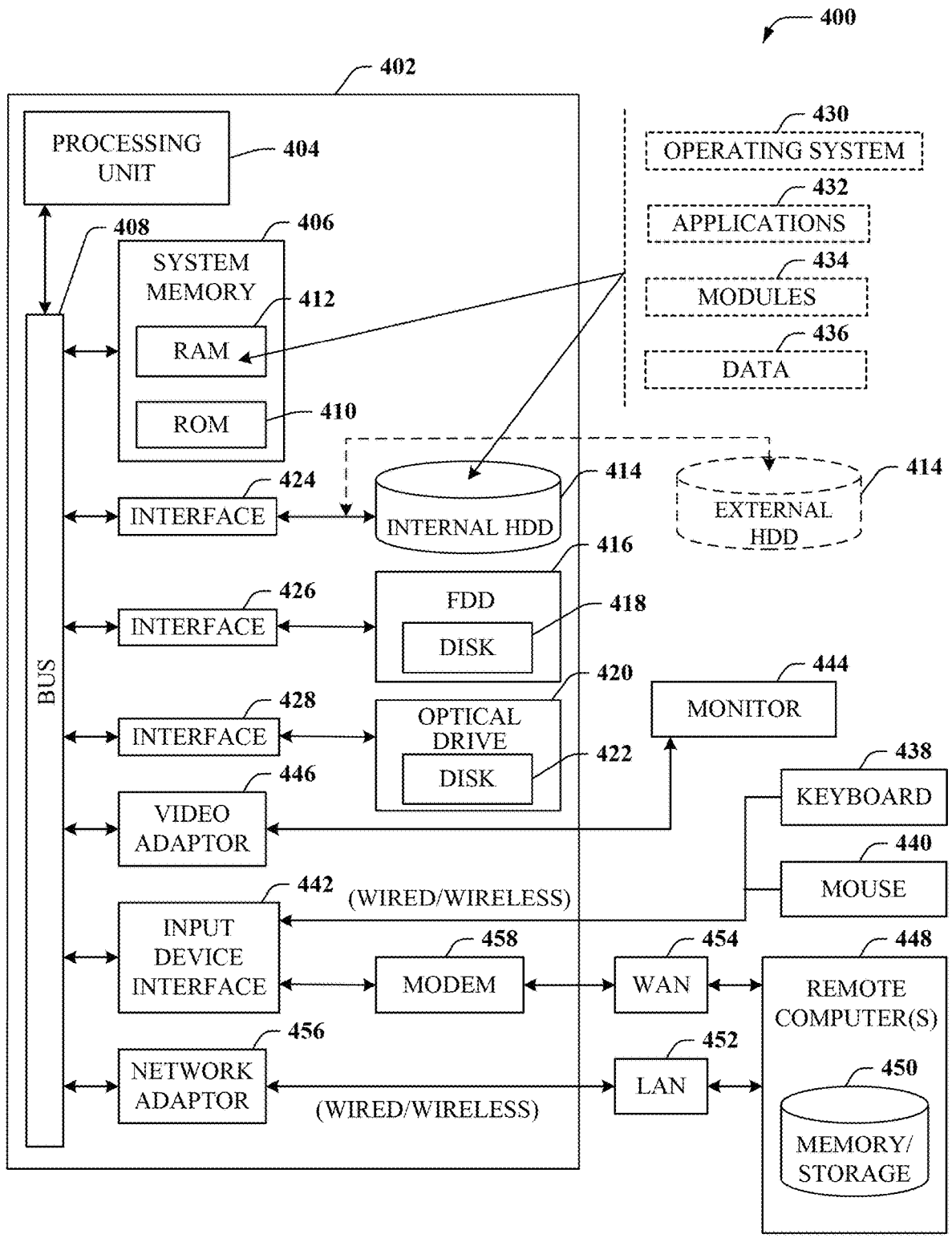
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented, including core video content servers, edge video content servers, and mobile devices.

In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
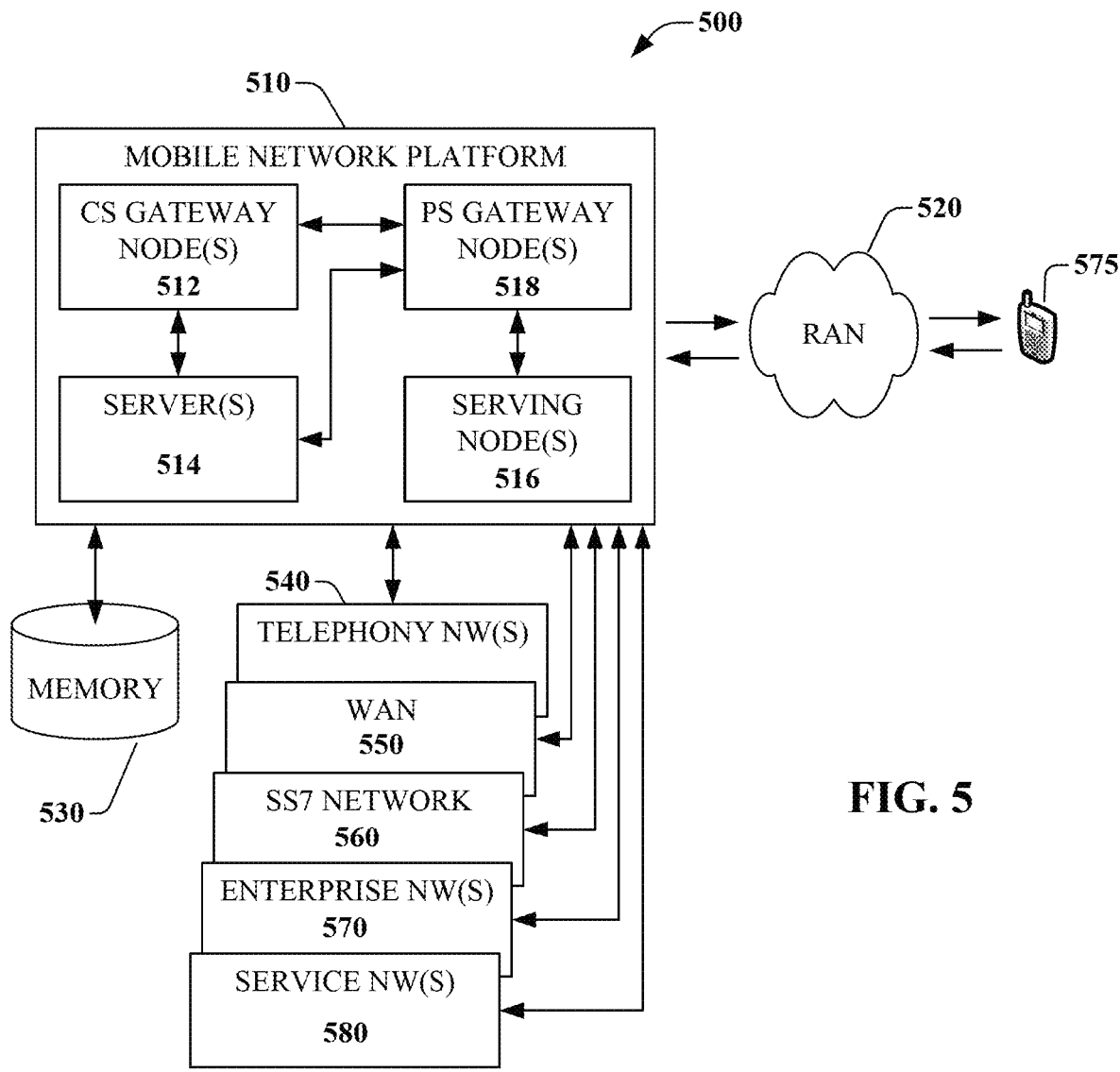
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. Further, the mobile network platform 510 can include the core video content server and edge video content server as well as the mobile devices described herein.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WAN) 550, enterprise network(s) 570, and service network(s) 580, which can be embodied in local area network(s) (LANs), can also be interfaced with mobile network platform 510 through PS gateway node(s) 518. It is to be noted that WAN 550 and enterprise network(s) 570 can embody, at least in part, a service network(s) like IP multimedia subsystem (IMS). Based on radio technology layer(s) available in technology resource(s) of radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
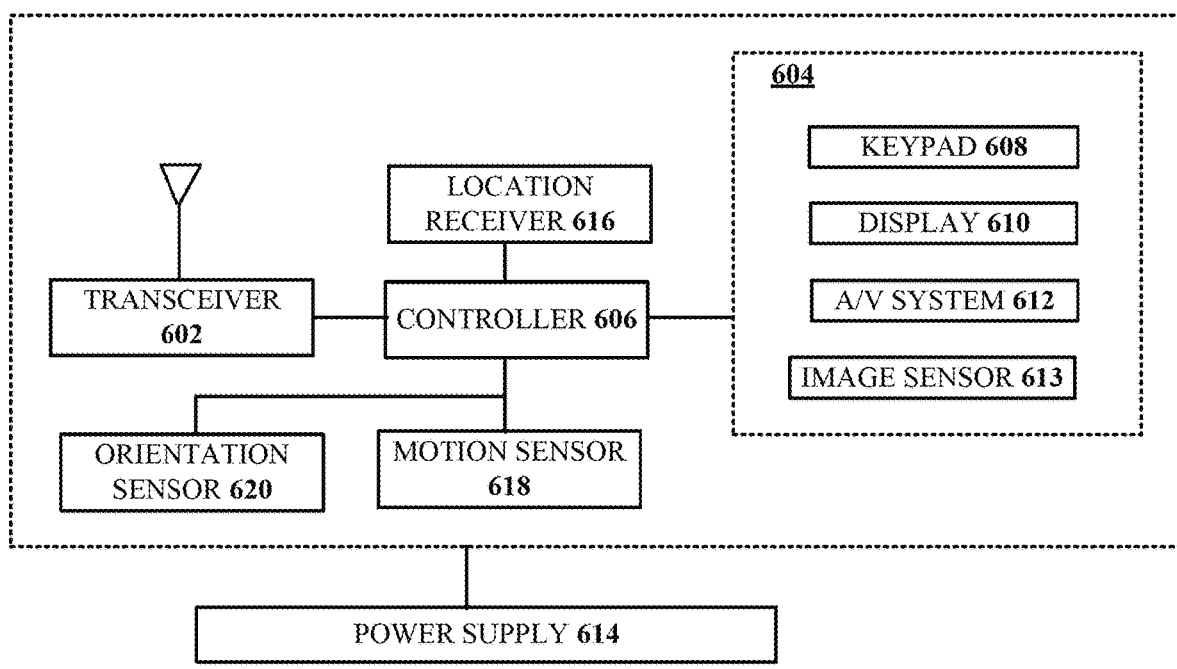
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125 as well as core video content servers, edge video content servers and mobile devices described herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
determining a first motion-to-update latency of a mobile device in relation to receiving a video content update provided by the device;
responsive to determining that the first motion-to-update latency exceeds a threshold:
determining a motion-to-update latency of the mobile device in relation to receiving video content updates from a plurality of edge servers, wherein the determining results in a plurality of motion-to-update latencies;
identifying a second motion-to-update latency from the plurality of motion-to-update latencies that is below the threshold;
identifying an edge server associated with the second motion-to-update latency; and
transmitting video content to the edge server to mitigate the first motion-to-update latency of the device, wherein the edge server provides a portion of the video content at different time intervals determined according to the second motion-to-update latency to the mobile device in response to receiving an indication from the mobile device of user head movement in viewing the video content resulting in a plurality of portions of video content, wherein the video content comprises panoramic video content, wherein a first portion of the plurality of portions of video content comprises a margin area surrounding a viewport area, wherein the margin area and the viewport area cover a plurality of head movements over a time period, where the margin area is determined by a coverage rate for the first portion of the video content, a cumulative probability distributed function of the coverage rate and the second motion-to-update latency, wherein the coverage rate is based on covering the plurality of head movements over the time period.

2. The device of claim 1, wherein the operations comprise mitigating jitter, packet loss, and frame drops associated with the video content.

3. The device of claim 1, wherein each of the plurality of motion-to-update latencies is determined according to a first time between detecting user motion of a virtual reality headset and display local rendering, a second time between sending a request from the mobile device for a content update and receiving the content update, a third time for processing the content update, a fourth time between sending the content update and receiving the content update at the mobile device, a fifth time for processing and display the content update by the mobile device, or any combination thereof.

4. The device of claim 3, wherein the request includes a motion index number, wherein the motion index number identifies a portion of the content update being requested.

5. The device of claim 4, wherein the edge server crops the video content to include the portion of the content update.

6. The device of claim 1, wherein the operations further comprise selecting a streaming protocol from a plurality of streaming protocols for use by the edge server.

7. The device of claim 6, wherein the streaming protocol being selected results in the edge server having the second motion-to-update latency.

8. The device of claim 7, wherein the edge server provides to the mobile device the portion of video content using the selected streaming protocol.

9. The device of claim 1, wherein the edge server crops the portion of the video content prior to providing the portion of the video content to the mobile device.

10. A non-transitory, machine-readable medium, comprising executable instructions that, when executed by an edge server including a processor, facilitate performance of operations, the operations comprising:
receiving a request for a portion of video content from a mobile device; and
providing the portion of the video content to the mobile device at a time determined according to a motion-to-update latency in response to receiving an indication from the mobile device of user head movement in viewing the video content, wherein the portion of video content comprises a margin area surrounding a viewport area, wherein the margin area and the viewport area cover a plurality of head movements over a time period, wherein the video content comprises panoramic video content, wherein a video content server transmits the video content to the edge server using a selected streaming protocol in response to determining the motion-to-update latency for the edge server using the selected streaming protocol is below a threshold, where the margin area is determined by a coverage rate for the portion of the video content, a cumulative probability distribution function of the coverage rate and the motion-to-update latency, wherein the coverage rate is based on covering the plurality of head movements over the time period.

11. The non-transitory, machine-readable medium of claim 10, wherein the mobile device is communicatively coupled to a virtual reality headset that presents the portion of the video content.

12. The non-transitory, machine-readable medium of claim 11, wherein the motion-to-update latency is determined according to a first time between detecting user motion of the virtual reality headset and display local rendering, a second time between sending a request from the mobile device for a content update and receiving the content update, a third time for processing the content update, a fourth time between sending the content update and receiving the content update at the mobile device, a fifth time for processing and display the content update by the mobile device, or any combination thereof.

13. The non-transitory, machine-readable medium of claim 12, wherein the request includes a motion index number, wherein the motion index number identifies a portion of the content update being requested.

14. The non-transitory, machine-readable medium of claim 13, wherein the operations further comprise cropping the video content to include the portion of the content update resulting in a cropped video content.

15. The non-transitory, machine-readable medium of claim 14, wherein the cropped video content comprises the margin area.

16. The non-transitory, machine-readable medium of claim 10, wherein the video content server identifies the selected streaming protocol according to the motion-to update latency of the selected streaming protocol.

17. A method, comprising:
providing by a mobile device comprising a processor, a request for a portion of video content to an edge server, wherein the request includes a motion index; and
receiving, by the mobile device, the portion of video content from the edge server according to the motion index and at a time determined according to a motion-to-update latency in response to transmitting an indication from the mobile device of user head movement in viewing the video content, wherein the edge server is selected from a plurality of edge servers by a video content server according to the motion-to-update latency of the edge server being below a threshold, wherein the edge server crops the portion of the video content prior to providing the portion of the video content to the mobile device resulting in a cropped portion of the video content, wherein the cropped portion of the video content comprises a margin area surrounding a viewport area, and wherein the edge server determines the margin area and the viewport area cover a plurality of head movements over a time period, wherein the margin area is determined by a coverage rate for the cropped portion of the video content, a cumulative probability distribution function of the coverage rate and the motion-to-update latency, wherein the coverage rate is based on covering the plurality of head movements over the time period.

18. The method of claim 17, wherein the mobile device is communicatively coupled to a virtual reality headset for presentation of the video content.

19. The method of claim 18, wherein the motion-to-update latency is determined according to a first time between detecting user motion of the virtual reality headset and display local rendering, a second time between sending a request from the mobile device for a content update and receiving the content update, a third time for processing the content update, a fourth time between sending the content update and receiving the content update at the mobile device, a fifth time for processing and display the content update by the mobile device, or any combination thereof.

20. The method of claim 17, wherein the edge server provides the portion of video content using a selected streaming protocol that results in the motion-to-update latency of the edge server.

* * * * *